United States Patent
Tanio

(10) Patent No.: US 12,068,891 B2
(45) Date of Patent: Aug. 20, 2024

(54) SIGNAL TRANSMISSION APPARATUS, PARAMETER DETERMINATION APPARATUS, SIGNAL TRANSMISSION METHOD, PARAMETER DETERMINATION METHOD AND RECORDING MEDIUM

(71) Applicant: NEC Corporation, Tokyo (JP)

(72) Inventor: Masaaki Tanio, Tokyo (JP)

(73) Assignee: NEC CORPORATION, Tokyo (JP)

( * ) Notice: Subject to any disclaimer, the term of this patent is extended or adjusted under 35 U.S.C. 154(b) by 4 days.

(21) Appl. No.: 18/009,090

(22) PCT Filed: Jun. 10, 2020

(86) PCT No.: PCT/JP2020/022847
§ 371 (c)(1),
(2) Date: Dec. 8, 2022

(87) PCT Pub. No.: WO2021/250813
PCT Pub. Date: Dec. 16, 2021

(65) Prior Publication Data
US 2023/0275788 A1    Aug. 31, 2023

(51) Int. Cl.
*H04L 25/02* (2006.01)
*H04L 25/03* (2006.01)

(52) U.S. Cl.
CPC .... *H04L 25/0254* (2013.01); *H04L 25/03165* (2013.01)

(58) Field of Classification Search
CPC .............. H04L 25/0254; H04L 25/03165
See application file for complete search history.

(56) References Cited

U.S. PATENT DOCUMENTS 7,782,979 B2 * 8/2010 Long .................. H03F 1/3241
                                                              330/149
11,706,104 B2 * 7/2023 Grassi .................. G06N 20/00
                                                              709/224
(Continued)

FOREIGN PATENT DOCUMENTS

EP        2293435 A1 *  3/2011  .............. H03F 1/30
JP     H08-249007 A      9/1996
(Continued)

OTHER PUBLICATIONS

International Search Report for PCT Application No. PCT/JP2020/022847, mailed on Sep. 24, 2020.
Zhijian Yu, "A Generalized Digital Predistortion Model Based on Artificial Neural Networks", Proceedings of 2018 Asia-Pacific Microwave Conference, pp. 935-937, Nov. 2018.
J.Kim, K.Konstantinou, "Digital Predistortion of wideband signals based on power amplifier with memory", IET Electron Letter, vol. 37 No. 23, pp. 1417-1418, Nov. 2001.
(Continued)

*Primary Examiner* — Freshteh N Aghdam

(57) ABSTRACT

A signal transmission apparatus (1) includes: a distortion compensation unit (11) for performing a distortion compensation processing on an input signal (x) by using a Neural Network (112) including L+1 arithmetic layers that include L (L is a variable number representing an integer equal to or larger than 1) hidden layer (112M) and an output layer (112O); a storage unit (13) for storing parameter sets (131) each of which includes a parameter for Q (Q is a variable number representing an integer equal to or smaller than L) arithmetic layer of the L+1 arithmetic layers; and an application unit (142) for selecting one parameter set from the parameter sets based on a signal pattern of the input signal and applying the parameter included in the selected one parameter set to the M number of arithmetic layer, a parameter of another arithmetic layer of the L+1 arithmetic layers, which is other than the Q arithmetic layer, is fixed.

9 Claims, 7 Drawing Sheets

(56) References Cited

U.S. PATENT DOCUMENTS

| | | | |
|---|---|---|---|
| 2011/0187454 A1 | 8/2011 | Satsuba et al. | |
| 2013/0343483 A1* | 12/2013 | Bai | H03F 1/3247 |
| | | | 375/297 |
| 2020/0295975 A1* | 9/2020 | Li | H04L 25/03165 |
| 2022/0036176 A1* | 2/2022 | Megretski | G06N 3/084 |

FOREIGN PATENT DOCUMENTS

| | | |
|---|---|---|
| JP | H11-134003 A | 5/1999 |
| JP | 2002-261848 A | 9/2002 |
| JP | 2009-064216 A | 3/2009 |
| JP | 2011-160043 A | 8/2011 |
| JP | 2017-220744 A | 12/2017 |

OTHER PUBLICATIONS

Dennis R.Morgan, Zhengxiang Ma, Jaehyeong Kim, Michael G.Zierdt, Hohn Pastalan, "A Generalized Memory Polynomial Model for Digital Predistortion of RF Power Amplifiers", IEEE Transaction on Signal Processing, vol. 54 No 10, pp. 3852-3860, Oct. 2006.

Meenakshi Rawat, Fadhel M.Ghannouchi, "A Mutual Distortion and Impairment Compensator for Wideband Direct-Conversion Transmitters Using Neural Networks", IEEE Transaction on Broadcast, vol. 58 No. 2, pp. 168-177, Jun. 2012.

* cited by examiner

SIGNAL TRANSMISSION APPARATUS, PARAMETER DETERMINATION APPARATUS, SIGNAL TRANSMISSION METHOD, PARAMETER DETERMINATION METHOD AND RECORDING MEDIUM

This application is a National Stage Entry of PCT/JP2020/022847 filed on Jun. 10, 2020, the contents of all of which are incorporated herein by reference, in their entirety.

TECHNICAL FIELD

The present disclosure relates to a technical field of a signal transmission apparatus, a signal transmission method and a computer program that are configured to perform a distortion compensation processing on an input signal by using a Neural Network and a parameter determination apparatus, a parameter determination method and a computer program that are configured to determine a parameter of the Neural Network that is used to perform the distortion compensation processing, for example.

BACKGROUND ART

Recently, a utilization of a Neural Network is studied in various technical fields. For example, in a signal transmission apparatus that is used in a mobile communication system and so on, a distortion compensation apparatus in a DPD (Digital Pre-Distortion) type is built by using a Neural Network (see a Non-Patent Literature 1).

In addition, there are a Patent Literature 1 to a Patent Literature 6 and a Non-Patent Literature 2 to a Non-Patent Literature 4 as a background art document relating to the present invention.

CITATION LIST

Patent Literature

Patent Literature 1: JP2009-064216A1
Patent Literature 2: JPH11(1999)-134003A1
Patent Literature 3: JPH08(1996)-249007A1
Patent Literature 4: JP2017-220744A1
Patent Literature 5: JP2011-160043A1
Patent Literature 6: JP2002-261848A1

Non-Patent Literature

Non-Patent Literature 1: Zhijian Yu, "A Generalized "Digital Predistortion Model Based on Artificial Neural Networks", Proceedings of 2018 Asia-Pacific Microwave Conference, pp. 935-937, November 2018
Non-Patent Literature 2: J. Kim, K. Konstantinou, "Digital Predistortion of wide band signals based on power amplifier with memory", IET Electron Letter, Vol. 37 No. 23, pp. 1417-1418, November 2001
Non-Patent Literature 3: Dennis R. Morgan, Zhengxiang Ma, Jaehyeong Kim, Michael G. Zierdt, Hohn Pastalan, "A Generalized Memory Polynomial Model for Digital Predistortion of RF Power Amplifiers", IEEE Transaction on Signal Processing, Vol. 54 No 10, pp. 3852-3860, October 2006
Non-Patent Literature 4: Meenakshi Rawat, Fadhel M. Ghannouchi, "A Mutual Distortion and Impairment Compensator for Wideband Direct-Conversion Transmitters Using Neural Networks", IEEE Transaction on Broadcast, Vol. 58 No. 2, pp. 168-177, January 2012

SUMMARY OF INVENTION

Technical Problem

Generally, the signal transmission apparatus generates a distortion compensation signal from the input signal by using the distortion compensation apparatus, generates a transmission signal from the distortion compensation signal by using a power amplifier and transmits the transmission signal to a signal reception apparatus. In this case, the distortion compensation apparatus performs the distortion compensation processing on the input signal so as to compensate a distortion that is generated in the transmission signal due to the power amplifier.

Here, the distortion generated in the transmission signal varies depending on a characteristic of the transmission signal (namely, a characteristic of the input signal). In this case, it is desired that the signal transmission apparatus switch (namely, change) a parameter of the Neural Network based on the characteristic of the input signal so that the varying distortion is properly compensated.

As one example of a method of switching the parameter of the Neural Network, there is a method of storing, in a memory, a plurality of parameter sets each of which includes the parameter of the Neural Network so that they correspond to a plurality of signal patterns can be taken by the input signal (namely, a plurality of signal patterns that can be distinguished from each other by the characteristic of the input signal) and applying, to the Neural Network, the parameter included in one parameter set that is selected based on the characteristic of the Neural Network. However, the number of the parameter of the Neural Network is generally enormous. Thus, when the parameter sets each of which includes all of the parameter(s) of the Neural Network and the number of which is equal to the number of the signal patterns that is usable as the input signal are stored in the memory, the memory is required to have an enormous capacity. As a result, there is a possibility that a size of a circuit of the signal transmission apparatus is too large to be ignored.

It is therefore an example object of the present disclosure to provide a signal transmission apparatus, a parameter determination apparatus, a signal transmission method, a parameter determination method and a recording medium that can solve the technical problem described above. As one example, the example object of the present disclosure is to provide a signal transmission apparatus, a parameter determination apparatus, a signal transmission method, a parameter determination method and a recording medium that are configured to reduce an increase of the size of the circuit of the signal transmission apparatus.

Solution to Problem

One example aspect of a signal transmission apparatus is a signal transmission apparatus including: a distortion compensation unit that is configured to perform a distortion compensation processing on an input signal by using a Neural Network including arithmetic layers the number of which is $L+1$, wherein the arithmetic layers include a hidden layer the number of which is L (note that L is a variable number representing an integer that is equal to or larger than 1) and an output layer; a storage unit that is configured to store a plurality of parameter sets each of which includes a parameter for a Q (note that Q is a variable number representing an integer that is equal to or smaller than L) number of arithmetic layer of the L+1 number of arithmetic layers; and an applications unit that is configured to select one parameter set from the plurality of parameter sets based on a signal pattern of the input signal and apply the parameter included in the selected one parameter set to the M number of arithmetic layer, a parameter of another arithmetic layer of the L+1 number of arithmetic layers, which is other than the Q number of arithmetic layer, is fixed.

One example aspect of a parameter determination apparatus is a parameter determination apparatus that is configured to determine, by using a plurality of learning signals, a parameter of a Neural Network including arithmetic layers the number of which is L+1, wherein the arithmetic layers include a hidden layer the number of which is L (note that L is a variable number representing an integer that is equal to or larger than 1) and an output layer, wherein the parameter determination apparatus includes: a classification unit that is configured to classify a signal pattern of each of the plurality of learning signals into N number of types of signal patterns; a first generation unit that is configured to generate N number of first parameter sets each of which includes a parameter for a Q (note that Q is a variable number representing an integer that is equal to or smaller than L) number of arithmetic layer of the L+1 number of arithmetic layers by respectively using the N number of types of learning signals that have been classified into the N number of types of signal patterns, respectively; and a second generation unit that is configured to generate one second parameter set including a parameter for another arithmetic layer of the L+1 number of arithmetic layers, which is other than the Q number of arithmetic layer, by using the N number of types of learning signals.

One example aspect of a signal transmission method is a signal transmission method including: a distortion compensation step at which a distortion compensation processing is performed on an input signal by using a Neural Network including arithmetic layers the number of which is L+1, wherein the arithmetic layers include a hidden layer the number of which is L (note that L is a variable number representing an integer that is equal to or larger than 1) and an output layer; and an application step at which one parameter set is selected based on a signal pattern of the input signal from a storage unit that is configured to store a plurality of parameter sets each of which includes a parameter for a Q (note that Q is a variable number representing an integer that is equal to or smaller than L) number of arithmetic layer of the L+1 number of arithmetic layers, and the parameter included in the selected one parameter set is applied to the M number of arithmetic layer, a parameter of another arithmetic layer of the L+1 number of arithmetic layers, which is other than the Q number of arithmetic layer, being fixed.

One example aspect of a parameter determination method is a parameter determination method of determining, by using a plurality of learning signals, a parameter of a Neural Network including arithmetic layers the number of which is L+1, wherein the arithmetic layers include a hidden layer the number of which is L (note that L is a variable number representing an integer that is equal to or larger than 1) and an output layer, wherein the parameter determination method includes: a classification step at which a signal pattern of each of the plurality of learning signals is classified into N number of types of signal patterns; a first generation step at which N number of first parameter sets each of which includes a parameter for a Q (note that Q is a variable number representing an integer that is equal to or smaller than L) number of arithmetic layer of the L+1 number of arithmetic layers are generated by respectively using the N number of types of learning signals that have been classified into the N number of types of signal patterns, respectively; and a second generation step at which one second parameter set including a parameter for another arithmetic layer of the L+1 number of arithmetic layers, which is other than the Q number of arithmetic layer, is generated by using the N number of types of learning signals.

A first example aspect of a recording medium is a recording medium on which a computer program allowing a computer to execute a signal transmission method is recorded, wherein the signal transmission method includes: a distortion compensation step at which a distortion compensation processing is performed on an input signal by using a Neural Network including arithmetic layers the number of which is L+1, wherein the arithmetic layers include a hidden layer the number of which is L (note that L is a variable number representing an integer that is equal to or larger than 1) and an output layer; and an application step at which one parameter set is selected based on a signal pattern of the input signal from a storage unit that is configured to store a plurality of parameter sets each of which includes a parameter for a Q (note that Q is a variable number representing an integer that is equal to or smaller than L) number of arithmetic layer of the L+1 number of arithmetic layers, and the parameter included in the selected one parameter set is applied to the M number of arithmetic layer, a parameter of another arithmetic layer of the L+1 number of arithmetic layers, which is other than the Q number of arithmetic layer, being fixed.

A second example aspect of a recording medium is a recording medium on which a computer program allowing a computer to execute a parameter determination method is recorded, wherein the parameter determination method is a parameter determination method of determining, by using a plurality of learning signals, a parameter of a Neural Network including arithmetic layers the number of which is L+1, wherein the arithmetic layers include a hidden layer the number of which is L (note that L is a variable number representing an integer that is equal to or larger than 1) and an output layer, the parameter determination method includes: a classification step at which a signal pattern of each of the plurality of learning signals is classified into N number of types of signal patterns; a first generation step at which N number of first parameter sets each of which includes a parameter for a Q (note that Q is a variable number representing an integer that is equal to or smaller than L) number of arithmetic layer of the L+1 number of arithmetic layers are generated by respectively using the N number of types of learning signals that have been classified into the N number of types of signal patterns, respectively; and a second generation step at which one second parameter set including a parameter for another arithmetic layer of the L+1 number of arithmetic layers, which is other than the Q number of arithmetic layer, is generated by using the N number of types of learning signals.

Advantageous Effects of Invention

According to the example aspect of each of the signal transmission apparatus, the parameter determination apparatus, the signal transmission apparatus, the parameter determination method and the recording medium described above, it is possible to reduce an increase of a size of a circuit of the signal transmission apparatus (especially, a size of a circuit of the storage unit).

DESCRIPTION OF EXAMPLE EMBODIMENTS

Next, with reference to the drawings, an example embodiment of a signal transmission apparatus, a parameter determination apparatus, a signal transmission method, a parameter determination method and a recording medium will be described.

<1> Signal Transmission Apparatus 1

<1-1> Configuration of Signal Transmission Apparatus 1

Figure 1:
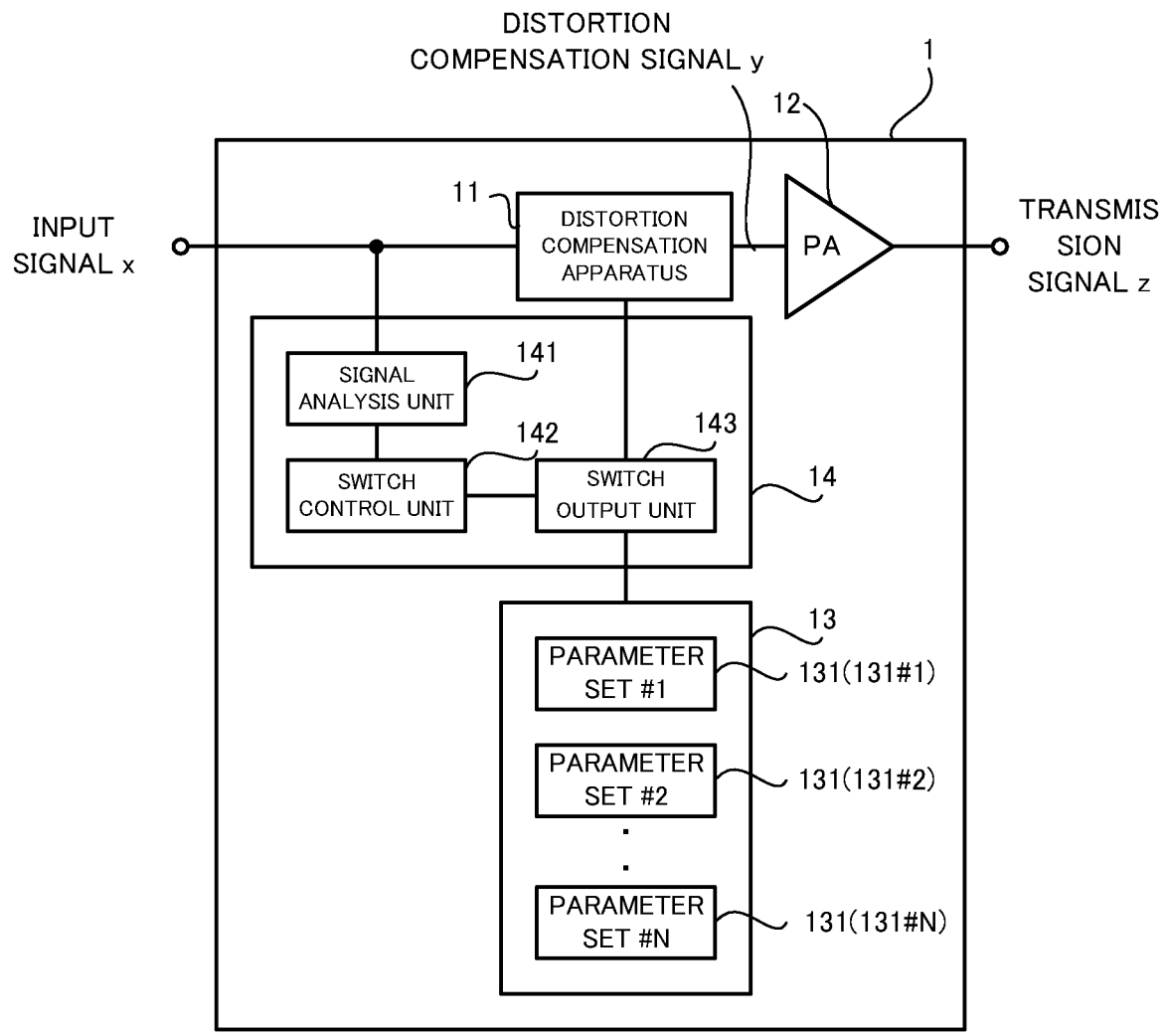
FIG. 1 is a block diagram that illustrates a configuration of a signal transmission apparatus in a present example embodiment.

Firstly, with reference to FIG. 1, a signal transmission apparatus 1 in the present example embodiment will be described. FIG. 1 is a block diagram that illustrates a configuration of the signal transmission apparatus 1 in the present example embodiment.

As illustrated in FIG. 1, the signal transmission apparatus 1 transmits a transmission signal z to a non-illustrated signal reception apparatus through a communication line. The communication line is typically a wireless communication line, however, at least a part thereof may be a wired communication line. In order to transmit the transmission signal z, the signal transmission apparatus 1 includes a distortion compensation apparatus 11 and a power amplifier (PA) 12.

The distortion compensation apparatus 11 is configured to perform a distortion compensation processing on an input signal x to generate a distortion compensation signal y. The distortion compensation apparatus 11 is configured to perform, on the input signal x, the distortion compensation processing for compensating (typically, reducing or canceling) a distortion that is generated in the transmission signal z due to an operation of the power amplifier 12 to generate the distortion compensation signal y. In the present example embodiment, the distortion compensation apparatus 11 may be a distortion compensation apparatus in a DPD type, for example. Especially, the distortion compensation apparatus 11 may generate the distortion compensation signal y obtained by reflecting an inverse distortion characteristic of the power amplifier 12 on the input signal x. In this case, it is possible to achieve both of a reduction of an electrical power consumption and a reduction of a distortion of the signal transmission apparatus 1. Specifically, it is possible to achieve both of an improvement of an efficiency of the signal transmission apparatus 1 and a securement of a linearity of an amplification characteristic of the signal transmission apparatus 1.

The power amplifier 12 is configured to perform a predetermined operation on the distortion compensation signal y outputted from the distortion compensation apparatus 11. Specifically, the power amplifier 12 is configured to amplify the distortion compensation signal y. The distortion compensation signal y amplified by the power amplifier 12 is transmitted, as the transmission signal z, to the signal reception apparatus through the communication line. Here, when the distortion compensation apparatus 11 is the distortion compensation apparatus in the DPD type as described above, the power amplifier 12 outputs the transmission signal z that is linear with respect to the input signal x, because the distortion of the signal in the power amplifier 12 is cancelled by the inverse distortion of the signal in the distortion compensation apparatus 11.

Figure 2:
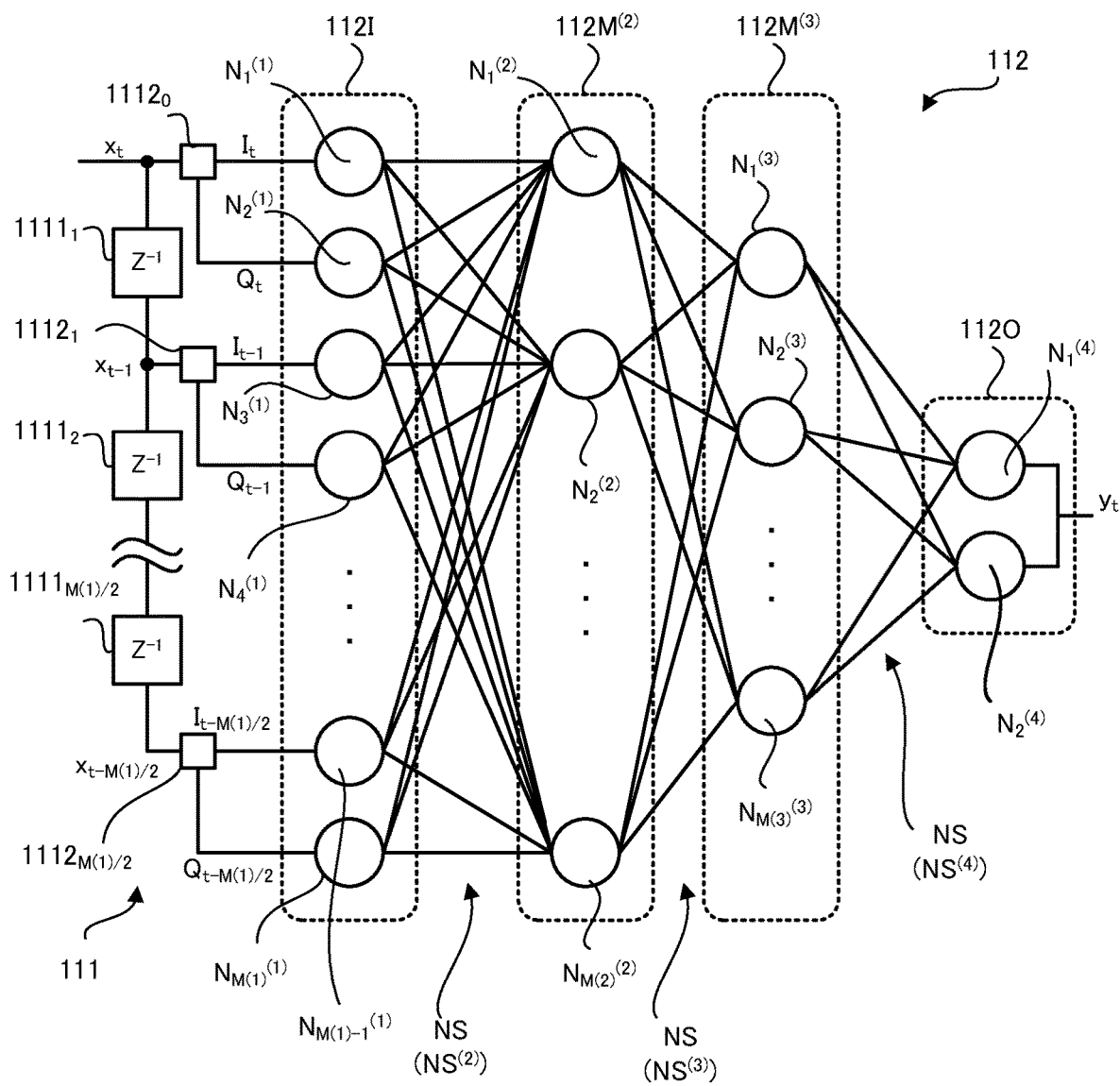
FIG. 2 is a block diagram that illustrates a configuration of a distortion compensation circuit.

Especially in the present example embodiment, the distortion compensation apparatus 11 is configured to perform the distortion compensation on the input signal x by using a Neural Network 112 (see FIG. 2). Next, a configuration of the distortion compensation apparatus 11 will be further described in detail with reference to FIG. 2. FIG. 2 is a block diagram that illustrates the configuration of the distortion compensation apparatus 11.

As illustrated in FIG. 2, the distortion compensation apparatus 11 includes a signal generating unit 111 and the Neural Network 112.

The signal generating unit 111 generates, from an input signal $x_t$ inputted to the distortion compensation apparatus 11, a plurality of signals (typically, a plurality of signals to which different delays are added, respectively) that are inputted to the Neural Network 112. Note that the input signal $x_t$ means a complex signal of the input signal x that is inputted to the distortion compensation apparatus 11 at a time t.

The signal generating unit 111 may generate the plurality of signals by using any method, as long as the signal generating unit 111 is capable of generating, from the input signal $x_t$, the plurality of signals that are inputted to the Neural Network 112. In an example illustrated in FIG. 2, the signal generating unit 111 generates an input signal $x_{t-1}$ to an input signal $x_{t-M(1)/2}$ based on the input signal $x_t$. Note that a variable number M(1) represents the total number of a node (namely, a neuron) $N^{(1)}$ that is included in a below described input layer 112I of the Neural Network 112. A symbol "/" means a division (the same is applied to the below described description). In order to generate the input signal $x_{t-1}$ to the input signal $x_{t-M(1)/2}$ based on the input signal $x_t$, the signal generating unit 111 includes delay circuits 1111 the number of which is M(1)/2 (specifically, a delay apparatus $1111_1$ to a delay apparatus $1111_{M(1)/2}$. The delay apparatus $1111_h$ (note that a variable number h is an index representing an integer from t to t−M(1)/2) adds a delay to the input signal $x_{t-h+1}$ to generate the input signal $x_{t-h}$. Furthermore, the signal generating unit 111 generates, from the input signal $x_{t-h}$, an input signal $I_{t-hg}$ that corresponds to an I axis signal component of the input signal $x_{t-t}$ and an input signal $Q_{t-h}$ that corresponds to a Q axis signal component of the input signal $x_{t-h}$. The I axis signal component of the input signal $x_{t-h}$ corresponds to an in-phase signal component of a waveform of the input signal $x_{t-h}$. The Q axis signal component of the input signal $x_{t-h}$ corresponds to a quadrature component of the waveform of the input signal $x_{t-h}$. In order to generate the input signals $I_{t-h}$ and $Q_{t-h}$ from the input signal $x_{t-h}$, the signal generating unit 111 includes signal converters 1112 the number of which is M(1)/2+1 (specifically, a signal converter $1112_0$ to a signal converter $1112_{M(1)/2}$. The signal converter $1112_h$ generate the input signals $I_{t-h}$ and $Q_{t-h}$ from the input signal $x_{t-h}$. As a result, the input signals $I_t$ to $I_{t-M(1)/2}$ and the input signals $Q_t$ to $Q_{t-M(1)/2}$ are inputted to the Neural Network 112.

Note that the signal generating unit 111 may generate the input signal $x_{t-1}$ to the input signal $x_{t-M(1)}$ based on the input signal $x_{t-h}$ and input amplitude values of the generated input signal $x_t$ to the input signal $x_{t-M(1)}$ to the Neural Network 112. Moreover, the signal generating unit 111 may mix the amplitude values of the input signal $x_t$ to the input signal $x_{t-M(1)}$, the input signal $I_t$ to the input signal $I_{t-M(1)}$ and the input signal $Q_t$ to the input signal $Q_{t-M(1)}$ and input them to the Neural Network 112. The signal generating unit 111 may input a value (for example, an exponential value and the like) calculated by using the amplitude values of the input signal $x_t$ to the input signal $x_{t-M(1)}$, the input signal $I_t$ to the input signal $I_{t-M(1)}$ and the input signal $Q_t$ to the input signal $Q_{t-M(1)}$ to the Neural Network 112.

The Neural Network 112 is configured to generate a distortion signal $y_t$ (namely, the input signal $x_t$ on which the distortion compensation has been already performed) based on the input signal $I_t$ to the input signal $I_{t-M(1)/2}$ and the input signal $Q_t$ to the input signal $Q_{t-M(1)/2}$. The Neural Network 112 includes the input layer 112I, a hidden layer (namely, a middle layer) 112M the number of which is L (note that L is a variable number representing an integer that is equal to or larger than 1) and an output layer 112O. In the example illustrated in FIG. 2, the Neural Network 112 includes two hidden layers 112M (specifically, a first hidden layer $112M^{(2)}$ and a second hidden layer $112M^{(3)}$), however, may include one or three or more hidden layer 112. In the below described description, the Neural Network 112 including the first hidden layer $112M^{(2)}$ and the second hidden layer $112M^{(3)}$ will be described for the purpose of convenience of the description. Note that each of the hidden layer 112M and the output layer 112O is one example of "an arithmetic layer".

The input layer 112I is a first layer of the Neural Network 112. The input layer 112I includes nodes $N^{(1)}$ the number of which is M(1). In the below described description, the M(1) number of nodes $N^{(1)}$ are referred to as a node $N_1^{(1)}$ to a node $N_{M(1)}^{(1)}$ to distinguish them from each other. The variable number M(1) is typically an integer that is equal to or larger than 2. The first hidden layer $112M^{(2)}$ is a second layer of the Neural Network 112. The first hidden layer $112M^{(2)}$ includes nodes $N^{(2)}$ the number of which is M(2). In the below described description, the M(2) number of nodes $N^{(2)}$ are referred to as a node $N_1^{(2)}$ to a node $N_{M(2)}^{(2)}$ to distinguish them from each other. The variable number M(2) is typically an integer that is equal to or larger than 2. The second hidden layer $112M^{(3)}$ is a third layer of the Neural Network 112. The second hidden layer $112M^{(3)}$ includes nodes $N^{(3)}$ the number of which is M(3). In the below described description, the M(3) number of nodes $N^{(3)}$ are referred to as a node $N_1^{(3)}$ to a node $N_{M(3)}^{(3)}$ to distinguish them from each other. The variable number M(3) is typically an integer that is equal to or larger than 2. The output layer 112O is a fourth layer of the Neural Network 112. The output layer 112O includes nodes $N^{(4)}$ the number of which is M(4). In the below described description, the M(4) number of nodes $N^{(4)}$ are referred to as a node $N_1^{(4)}$ to a node $N_{M(4)}^{(4)}$ to distinguish them from each other. The variable number M(4) is typically an integer that is equal to or larger than 2, however, may be 1. In the example illustrated in FIG. 2, the variable number M(4) is 2 and the output layer 112O includes the node $N_1^{(4)}$ and node $N_2^{(4)}$.

The input signal $I_t$ to the input signal $I_{t-M(1)/2}$ and the input signal $Q_t$ to the input signal $Q_{t-M(1)/2}$ are inputted to the node $N_1^{(1)}$ to the node $N_{M(1)}^{(1)}$ of the input layer 112I, respectively. In the example illustrated in FIG. 2, when k is an odd number, the input signal $I_{t-(k-1)/2}$ is inputted to the [k]-th node $N_k^{(1)}$ of the input layer 112I. When k is an even number, the input signal $Q_{t-(k-2)/2}$ is inputted to the [k]-th node $N_k^{(1)}$ of the input layer 112I. An output $H_k^{(1)}$ of the [k]-th node $N_k^{(1)}$ may be same as the input to the [k]-th node $N_k^{(1)}$. Alternatively, the output $H_k^{(1)}$ of the [k]-th node $N_k^{(1)}$ may be represented by an equation 1. "real (x)" in the equation 1 is a function that outputs a real number component of the input signal x that is the complex signal, and "imag (x)" in the equation 1 is a function that outputs an imaginary number component of the input signal x. The output $H_k^{(1)}$ of the [k]-th node $N_k^{(1)}$ of the input layer 112I is inputted to each of the node $N_1^{(2)}$ to the node $N_{M(2)}^{(2)}$ through M(2) number of connection paths that connect the [k]-th node $N_k^{(1)}$ of the input layer 112I and the node $N_1^{(2)}$ to node $N_{M(2)}^{(2)}$ of the first hidden layer $112M^{(2)}$, respectively.

$$H_k^{(1)} = \text{real}(x_{t-k+1}),$$ [equation 1]
$$H_{k+\frac{M(1)}{2}}^{(1)} = \text{imag}(x_{t-k+1})$$

An output $H_m^{(2)}$ of the [m]-th node $N_m^{(2)}$ of the first hidden layer $112M^{(2)}$ is represented by an equation 2. "$w_{k,m}^{(2)}$" in the equation 2 represents a weight in a connection path between the [k]-th node $N_k^{(1)}$ of the input layer 112I and the [m]-th node $N_m^{(2)}$ of the first hidden layer $112M^{(2)}$. "$b_m^{(2)}$" in the equation 2 represents a bias that is used (namely, added) in the [m]-th node $N_m^{(2)}$ of the first hidden layer $112M^{(2)}$. The weight $w_{k,m}^{(2)}$ and the bias $b_m^{(2)}$ correspond to the parameters of the first hidden layer $112M^{(2)}$. "f" in the equation 2 represents an activation function. A sigmoid function or a ReLu (Rectified Linear Unit) function may be used as the activation function, for example. The output $H_m^{(2)}$ of the [m]-th node $N_m^{(2)}$ of the first hidden layer $112M^{(2)}$ is inputted to each of the node $N_1^{(3)}$ to the node $N_{M(3)}^{(3)}$ through M(3) number of connection paths that connect the [m]-th node $N_m^{(2)}$ of the first hidden layer $112M^{(2)}$ and the node $N_1^{(3)}$ to node $N_{M(3)}^{(3)}$ of the second hidden layer $112M^{(3)}$, respectively. Note that the variable number m is an index representing an integer that is equal to or larger than 1 and that is equal to or smaller than M(2).

$$H_m^{(2)} = f\left(\left(\sum_{k=1}^{M^{(1)}} H_k^{(1)} \times w_{k,m}^{(2)}\right) + b_m^{(2)}\right)$$ [equation 2]

An output $H_n^{(3)}$ of the [n]-th node $N_n^{(3)}$ of the second hidden layer $112M^{(3)}$ is also represented by the equation 2. However, when the output $H_n^{(3)}$ is represented by the equation 2, "$H_k^{(1)}$" and "$H_m^{(2)}$" in the equation 2 are replaced by "$H_m^{(2)}$" and "$H_n^{(3)}$", respectively. "$w_{k,m}^{(2)}$" in the equation 2 is replaced by a weight $w_{m,n}^{(3)}$ in a connection path between the [m]-th node $N_m^{(2)}$ of the first hidden layer 112M$^{(2)}$ and the [n]-th node N$_n^{(3)}$ of the second hidden layer 112M$^{(3)}$, and "b$_m^{(2)}$" in the equation 2 is replaced by a bias b$_n^{(3)}$ that is used (namely, added) in the [n]-th node N$_n^{(3)}$ of the second hidden layer 112M$^{(3)}$. The weight w$_{m,n}^{(3)}$ and the bias b$_n^{(3)}$ correspond to the parameters of the second hidden layer 112M$^{(3)}$. The output H$_n^{(3)}$ of the [n]-th node N$_n^{(3)}$ of the second hidden layer 112M$^{(3)}$ is inputted to each of the node N$_1^{(4)}$ to node N$_m(4)(4)$ through M(4) number of connection paths that connect the [n]-th node N$_n^{(3)}$ of the second hidden layer 112M$^{(3)}$ and the node N$_1^{(4)}$ to node N$_{M(4)}^{(4)}$ of the output layer 112O, respectively. Note that the variable number n represents an integer that is equal to or larger than 1 and that is equal to or smaller than M(3).

An output H$_o^{(4)}$ of the [o]-th node N$_o^{(4)}$ of the output layer 112O is also represented by the equation 2. However, when the output H$_o^{(4)}$ is represented by the equation 2, "H$_k^{(1)}$" and "H$_m^{(2)}$" in the equation 2 are replaced by "H$_n^{(3)}$" and "H$_o^{(4)}$", respectively, "w$_{k,m}^{(2)}$" in the equation 2 is replaced by a weight w$_{n,o}^{(4)}$ in a connection path between the [n]-th node N$_n^{(3)}$ of the second hidden layer 112M$^{(3)}$ and the [o]-th node N$_o^{(4)}$ of the output layer 112O, and "b$_m^{(2)}$" in the equation 2 is replaced by a bias b$_o^{(4)}$ that is used (namely, added) in the [o]-th node N$_o^{(4)}$ of the output layer 112O. The weight w$_{n,o}^{(4)}$ and the bias b$_o^{(4)}$ correspond to the parameters of the output layer 112O. Note that the variable number 0 is an index representing an integer that is equal to or larger than 1 and that is equal to or smaller than M(4).

The output of the output layer 112O corresponds to a final output signal y$_t$. The output signal y$_t$ corresponds to the distortion compensation signal y generated from the input signal x$_t$ at the time t. Note that the output layer 112O may not include the activation function f. In this case, the output of the output layer 112O may be a linear sum obtained by using the outputs of the nodes N$_1^{(3)}$ to N$_{M(3)}^{(3)}$ of the second hidden layer 112M$^{(3)}$ as the basis.

A characteristic (substantially, a structure) of the Neural Network 112 is determined by the parameters including the above described weight w and the above described bias b, for example.

The weight w includes a weight w$^{(2)}$ between the input layer 112I and the first hidden layer 112M$^{(2)}$. The weight w$^{(2)}$ includes M(1)×M(2) number of weights w$_{k,m}^{(2)}$ (1≤k≤M(1), 1≤m≤M(2)) that correspond to M(1)×M(2) number of connection paths between the input layer 112I and the first hidden layer 112M$^{(2)}$. Namely, the weight w$^{(2)}$ is a vector determined by the M(1)×M(2) number of weights w$_{k,m}^{(2)}$. The weight w further includes a weight w$^{(3)}$ between the first hidden layer 112M$^{(2)}$ and the second hidden layer 112M$^{(3)}$. The weight w$^{(3)}$ includes M(2)×M(3) number of weights w$_{m,n}^{(3)}$ (1≤m≤M(2), 1≤n≤M(3)) that correspond to M(2)×M(3) number of connection paths between the first hidden layer 112M$^{(2)}$ and the second hidden layer 112M$^{(3)}$. Namely, the weight w$^{(3)}$ is a vector determined by the M(2)×M(3) number of weights w$_{m,n}^{(3)}$. The weight w further includes a weight w$^{(4)}$ between the second hidden layer 112M$^{(3)}$ and the output layer 112O. The weight w$^{(4)}$ includes M(3)×M(4) number of weights w$_{n,o}^{(4)}$ (1≤n≤M(3), 1≤o≤M(4)) that correspond to M(3)×M(4) number of connection paths between the second hidden layer 112M$^{(3)}$ and the output layer 112O. Namely, the weight w$^{(4)}$ is a vector determined by the M(3)×M(4) number of weights w$_{n,o}^{(4)}$.

The bias b includes a bias b$^{(2)}$ that is added in the first hidden layer 112M$^{(2)}$, a bias b$^{(3)}$ that is added in the second hidden layer 112M$^{(3)}$ and a bias b$^{(4)}$ that is added in the output layer 112O. The bias$^{(2)}$ includes M(2) number of biases b$_m^{(2)}$ (1≤m≤M(2)) that are added in the node N$_1^{(2)}$ to the node N$_{M(2)}^{(2)}$ included in the first hidden layer 112M$^{(2)}$, respectively. Namely, the bias b$^{(2)}$ is a vector determined by the M(2) number of biases b$_m^{(2)}$. The bias b$^{(3)}$ includes M(3) number of biases b$_n^{(3)}$ (1≤n≤M(3)) that are added in the node N$_1^{(3)}$ to the node N$_{M(3)}^{(3)}$ included in the second hidden layer 112M$^{(3)}$, respectively. Namely, the bias b$^{(3)}$ is a vector determined by the M(3) number of biases b$_n^{(3)}$. The bias b$^{(4)}$ includes M(4) number of biases b$_o^{(4)}$ (1≤o≤M(4)) that are added in the node N$_1^{(4)}$ to the node N$_{M(4)}^{(4)}$ included in the output layer 112O, respectively. Namely, the bias b$^{(4)}$ is a vector determined by the M(4) number of biases b$_o^{(4)}$.

In the present example embodiment, the signal transmission apparatus 1 switches (namely, changes) the parameters (namely, the weight w$^{(4)}$ and the biases b$^{(4)}$) of the output layer 112O based on a signal pattern of the input signal x. Note that the signal pattern of the input signal x is determined based on a characteristic (for example, an electric power characteristic) of the input signal x as described later in detail. On the other hand, the parameters (namely, the weight w$^{(2)}$ and the biases b$^{(2)}$) of the hidden layer 112M$^{(2)}$ and the parameters (namely, the weight w$^{(3)}$ and the biases b$^{(3)}$) of the hidden layer 112M$^{(3)}$ are fixed regardless of the signal pattern of the input signal x. In other words, the parameters of other layer (the hidden layers 112M in this case), which is other than the input layer 112I and the output layer 112O, is fixed regardless of the signal pattern of the input signal x. Note that a state where "the parameter is fixed" in the present example embodiment may mean a state where "the parameter is not changed", for example. Thus, the signal transmission apparatus 1 does not change the parameters of the hidden layer 112M$^{(2)}$ and the hidden layer 112M$^{(3)}$. In other words, the signal transmission apparatus 1 does not change the parameters of other layer (the hidden layers 112M in this case), which is other than the input layer 112I and the output layer 112O.

In order to switch the parameters of the output layer 112O, the signal transmission apparatus 1 includes a storage apparatus 13 and an arithmetic apparatus 14, as illustrated in FIG. 1.

The storage apparatus 13 is configured to store desired data. For example, the storage apparatus 13 may temporarily store the computer program to be executed by the arithmetic apparatus 14. For example, the storage apparatus 13 may temporarily store the data that are temporarily used by the arithmetic apparatus 14 when the arithmetic apparatus 14 executes the computer program. For example, the storage apparatus 13 may store the data that are stored for a long term or temporarily by the signal transmission apparatus 1. Note that the storage apparatus 13 may include at least one of a RAM (Random Access Memory), a ROM (Read Only Memory), a hard disk apparatus, a magneto-optical disk apparatus, an SSD (Solid State Drive), and a disk array apparatus. Namely, the storage apparatus 13 may include a non-transitory recording medium.

Especially in the present example embodiment, the storage apparatus 13 stores a plurality of parameter sets 131. Namely, the plurality of parameter sets 131 are stored in the storage apparatus 13. Thus, the storage apparatus 13 is one specific example of "a storage unit".

Each parameter set 131 includes parameters that should be applied to the output layer 112O when the signal pattern of the input signal x is one type of signal pattern that corresponds to each parameter set 131. In other words, each parameter set 131 includes a parameters that should be applied to the output layer 112O when the distortion compensation processing is performed on the input signal x having one type of signal pattern that corresponds to each parameter set 131. Thus, the number of the parameter set 131 stored in the storage apparatus 13 is typically equal to the number of the type of signal pattern that can be taken by the input signal x.

In an example illustrated in FIG. 2, the storage apparatus 13 stores, as the plurality of parameter sets 131, (1) a parameter set 131 #1 including the parameters that should be applied to the output layer 112O when the distortion compensation processing is performed on the input signal x having a first type of signal pattern, (2) a parameter set 131 #2 including the parameters that should be applied to the output layer 112O when the distortion compensation processing is performed on the input signal x having a second type of signal pattern that is different from the first type of signal pattern, . . . , and (N) a parameter set 131 #N including the parameters that should be applied to the output layer 112O when the distortion compensation processing is performed on the input signal x having a N-th type of signal pattern that is different from the first type of signal pattern to a (N−1)-th type of signal pattern. In this case, N types of signal patterns (namely, the first signal pattern to the N-th signal pattern) can be taken by the input signal x.

The arithmetic apparatus 14 includes at least one of a CPU (Central Processing Unit), a GPU (Graphic Processing Unit) and a FPGA (Field Programmable Gate Array), for example. The arithmetic apparatus 14 reads a computer program. For example, the arithmetic apparatus 14 may read a computer program stored by the storage apparatus 13. For example, the arithmetic apparatus 14 may read a computer program stored in a computer-readable non-transitory recording medium, by using a non-illustrated recording medium reading apparatus. The arithmetic apparatus 14 may obtain (namely, download or read) a computer program from a non-illustrated apparatus disposed outside the signal transmission apparatus 1 through a non-illustrated communication apparatus. The arithmetic apparatus 14 executes the read computer program. As a result, a logical functional block for performing an operation that should be performed by the signal transmission apparatus 1 (especially, an operation that should be performed by the arithmetic apparatus 14) is implemented in the arithmetic apparatus 14. Namely, the arithmetic apparatus 14 is configured to serve as a controller for implementing the operation that should be performed by the signal transmission apparatus 1 (especially, the operation that should be performed by the arithmetic apparatus 14).

In the present example embodiment, the logical functional block for switching the parameters of the output layer 112O is implemented in the arithmetic apparatus 14. FIG. 1 illustrates one example of the logical functional block for switching the parameters of the output layer 112O. As illustrated in FIG. 1, a signal analysis unit 141 that is one specific example of "a determination unit", a switch control unit 142 that is one specific example of "an application unit" and a switch output unit 143 are implemented as the logical functional blocks in the arithmetic apparatus 14.

Note that FIG. 1 merely conceptually (in other words, simply) illustrates the logical functional blocks for switching the parameters of the output layer 112O. Namely, the logical functional blocks illustrated in FIG. 1 is not necessarily implemented in the arithmetic apparatus 14 as they are, and a configuration of the logical functional blocks implemented in the arithmetic apparatus 14 is not limited to a configuration illustrated in FIG. 1, as long as the arithmetic apparatus 14 is configured to perform the operation that is performed by the logical functional blocks illustrated in FIG. 1.

The signal analysis unit 141 is configured to determine (in other words, calculate or classify) the signal pattern of the input signal x by analyzing the input signal x inputted into the distortion compensation apparatus 11. Namely, the signal analysis unit 141 is configured to determine, as the signal pattern of the input signal x, either one of the first type of signal pattern to the N-th type of signal pattern. A determined result of the signal pattern of the input signal x by the signal analysis unit 141 is outputted to the switch control unit 142.

As described above, the signal pattern of the input signal x is determinable based on the characteristic of the input signal x. Conversely, the input signal x is classifiable into either one of N types of signal patterns based on the characteristic of the input signal x. Thus, the signal analysis unit 141 determines the signal pattern of the input signal x based on the characteristic of the input signal x. As one example, the signal analysis unit 141 may determine the signal pattern of the input signal x based on the electric power characteristic of the input signal x. The electric power characteristic of the input signal x may include at least one of an average electric power of the input signal x and an electric power distribution of the input signal x. The average electric power of the input signal x may mean an average value of an electric power value (for example, an amplitude value) of the input signal x in a predetermined period, for example. The electric power distribution of the input signal x may mean an aspect of a variation of the electric power value of the input signal x along a time axis, for example.

The switch control unit 142 is configured to select one parameter set 131, which includes the parameters that should be applied to the output layer 112O, based on the signal pattern of the input signal x determined by the signal analysis unit 141 from the N number of parameter sets 131 stored in the storage apparatus 13. Namely, the switch control unit 142 is configured to select one parameter set 131 that corresponds to the signal pattern determined by the signal analysis unit 141 from the N number of parameter sets 131 stored in the storage apparatus 13.

Furthermore, the switch control unit 142 is configured to apply the parameters included in the selected one parameter set 131 to the output layer 112O. Namely, the switch control unit 142 is configured to set the parameters included in the selected one parameter set 131 to the output layer 112O. The switch control unit 142 controls the switch output unit 143 in order to apply the parameters included in the selected one parameter set 131 to the output layer 112O. The switch output unit 143 is a functional block that is configured to selectively output, to the output layer 112O, the parameters included in either one of the plurality of parameter sets 131 stored in the storage apparatus 13.

Figure 3:
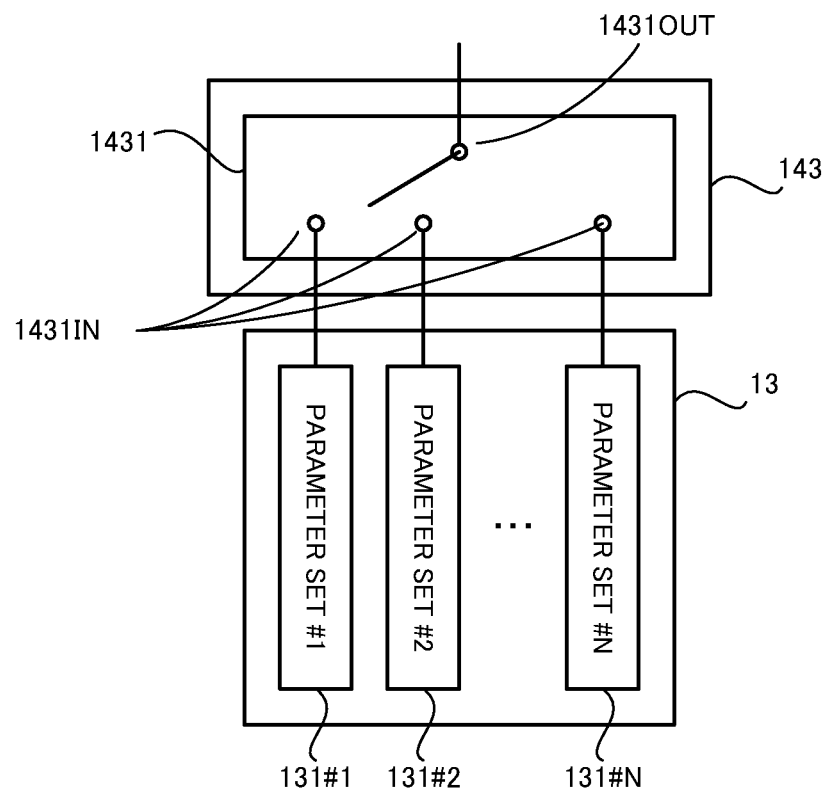
FIG. 3 is a block diagram that illustrates a configuration of a switch output unit in the present example embodiment.

FIG. 3 illustrates one example of the switch output unit 143. As illustrated in FIG. 3, the switch output unit 143 may include a switch 1431. The switch 1431 includes N number of input terminals 1431IN and one output terminal 1431OUT. The N number of parameter sets 131 stored in the storage apparatus 13 are inputted to the N number of input terminals 1431IN, respectively. The output terminal 1431OUT is connected to the distortion compensation apparatus 11. The switch 1431 allows either one of the N number of input terminals 1431IN to be connected to the output terminal 1431OUT under the control of the switch control unit 142. As a result, the parameters inputted into the one input terminal 1431IN connected to the output terminal 1431OUT are outputted to the distortion compensation apparatus 11 through the output terminal 1431OUT. As a result, the parameters inputted into the distortion compensation apparatus 11 through the output terminal 1431OUT are applied to the output layer 112O. Namely, the parameters of the output layer 112O are rewritten (in other words, updated) by the parameters outputted from the switch output unit 143. In other words, the parameters outputted from the switch output unit 143 are set to be the parameters of the output layer 112O. As a result, the output layer 112O performs a processing based on the parameters outputted from the switch output unit 143.

<1-2> Technical Effect of Signal Transmission Apparatus 1

As described above, in the signal transmission apparatus 1 in the present example embodiment, the parameters of the hidden layer 112M$^{(2)}$ and the parameters of the hidden layer 112M$^{(3)}$ are fixed regardless of the signal pattern of the input signal x. Thus, the parameters that are switched based on the signal pattern of the input signal x by the signal transmission apparatus 1 include only the parameters for the output layer 112O. Namely, the signal transmission apparatus 1 may not switch the parameters of all layers of the Neural Network 112 (namely, the parameters of the hidden layer 112M$^{(2)}$ and the hidden layer 112M$^{(3)}$ in addition to the output layer 112O). Thus, it is enough for each of the N number of parameter sets 131 stored in the storage apparatus 13 to include the parameters for the output layer 112O. Namely, each of the N number of parameter sets 131 stored in the storage apparatus 13 may not include the parameters for all layers of the Neural Network 112. Thus, in the present example embodiment, a storage capacity that is necessary for the storage apparatus 13 to store the N number of parameter sets 131 is smaller, compared to a case where all of the N number of parameter sets 131 include the parameters for all layers of the Neural Network 112. As a result, an increase of a size of the storage apparatus 13 (namely, a size of a circuit of the signal transmission apparatus 1) is reduced.

Here, an effect of reducing the increase of the size of the circuit will be described in a case where the number of the hidden layer 112M included in the Neural Network 112 is L (note that L is a variable number representing an integer that is equal to or larger than 1), the number of the parameter of each of the hidden layer 112M and the output layer 112O included in the Neural Network 112 is M and the number of the types of the signal pattern that can be taken by the input signal x is N. In a comparison example in which all of the N number of parameter sets 131 include the parameters for all layers of the Neural Network 112, the total number of the parameter stored in the storage apparatus 13 is "the total number of the hidden layer 112M and the output layer 112O"בthe number of the type of the signal pattern (namely, the number of the parameter set 131)"בthe number of the parameter of each of the hidden layer 112M and the output layer 112O". Namely, in the comparison example, the storage apparatus 13 needs to store the parameters the number of which is (L+1)×N×M. On the other hand, in the present example embodiment, the total number of the parameter stored in the storage apparatus 13 is "the total number of the output layer 112O"בthe number of the type of the signal pattern (namely, the number of the parameter set 131)"בthe number of the parameter of each of the output layer 112O". Namely, in the present example embodiment, it is enough for the storage apparatus 13 to store the parameters the number of which is 1×N×M. Thus, in the present example embodiment, the total number of the parameter stored in the storage apparatus 13 is reduced by (L+1)×N×M−1×N×M=L×N×M. Thus, the effect of reducing the increase of the size of the circuit is larger as the variable number L is larger (namely, as the number of the hidden layer 112M of the Neural Network 112 is larger). Moreover, the effect of reducing the increase of the size of the circuit is larger as the variable number B is larger (namely, as the number of the type of the signal pattern is larger). Moreover, the effect of reducing the increase of the size of the circuit is larger as the variable number M is larger (namely, as the number of the parameter of each layer of the Neural Network 112 is larger).

As one example, when L=1 and N=5, the storage apparatus 13 needs to store the parameters the number of which is 10×M. in the comparison example, however, it is enough for the storage apparatus 13 to store the parameters the number of which is 5×M in the present example embodiment. Thus, the storage capacity that is necessary for the storage apparatus 13 to store the parameters is reduced to be almost half in the present example embodiment, compared to the comparison example. As another example, when L=2 and N=5, the storage apparatus 13 needs to store the parameters the number of which is 15×M. in the comparison example, however, it is enough for the storage apparatus 13 to store the parameters the number of which is 5×M in the present example embodiment. Thus, the storage capacity that is necessary for the storage apparatus 13 to store the parameters is reduced to be almost one third in the present example embodiment, compared to the comparison example.

In addition, in the present example embodiment, the signal transmission apparatus 1 switches the parameters of the output layer 112O that is the last layer of the plurality of layers included in the Neural Network 112. Namely, the signal transmission apparatus 1 switches the parameters of the output layer 112O that has a relatively high (typically, highest) contribution to an accuracy of the output of the Neural Network 112. Thus, even when the parameters of the hidden layer 112M$^{(2)}$ and the hidden layer 112M$^{(3)}$ are fixed, an accuracy of the distortion compensation processing by the distortion compensation apparatus 11 is not reduced to an unacceptable level. Thus, even when the parameters of the hidden layer 112M$^{(2)}$ and the hidden layer 112M$^{(3)}$ are fixed, the distortion compensation apparatus 11 is capable of properly performing the distortion compensation processing on the input signal x.

<2> Parameter Determination Apparatus 2

The above described parameters of the Neural Network 112 are determined by a parameter determination apparatus 2. Namely, the parameters of the first hidden layer 112M$^{(2)}$, the parameters of the second hidden layer 112M$^{(3)}$ and the parameters of the output layer 112O included in the N number of parameter sets 131 stored in the storage apparatus 13 are determined by the parameter determination apparatus 2. In this case, the parameter determination apparatus 2 corresponds to an apparatus that performs a training and the signal transmission apparatus 1 (especially, the distortion compensation apparatus 11) performs an inference by using the parameter obtained by the training. Next, the parameter determination apparatus 2 will be further described.

<2-1> Configuration of Parameter Determination Apparatus 2

Figure 4:
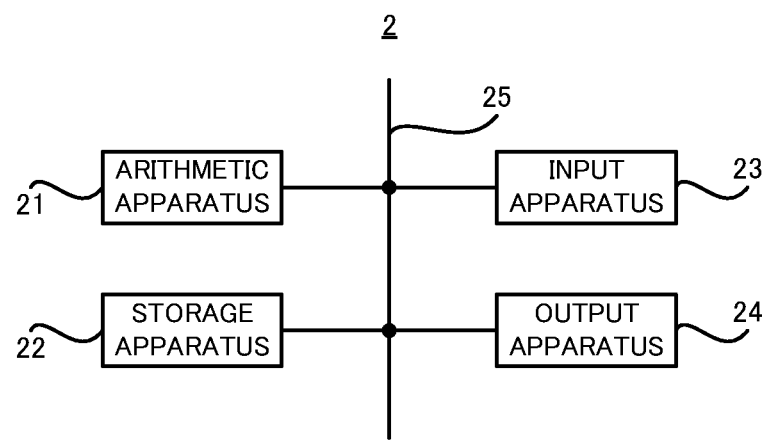
FIG. 4 a block diagram that illustrates a hardware configuration of a parameter determination apparatus in the present example embodiment.

Firstly, with reference to FIG. 4, a hardware configuration of the parameter determination apparatus 2 in the present example embodiment will be described. FIG. 4 is a block diagram that illustrates the hardware configuration of the parameter determination apparatus 2 in the present example embodiment.

As illustrated in FIG. 4, the parameter determination apparatus 2 includes an arithmetic apparatus 21 and a storage apparatus 22. Furthermore, the parameter determination apparatus 2 may include an input apparatus 23 and an output apparatus 24. However, the parameter determination apparatus 2 may not include at least one of the input apparatus 23 and the output apparatus 24. The arithmetic apparatus 21, the storage apparatus 22, the input apparatus 23 and the output apparatus 24 are connected through a data bus 25.

The arithmetic apparatus 21 includes at least one of a CPU, a GPU and a FPGA, for example. The arithmetic apparatus 21 reads a computer program. For example, the arithmetic apparatus 21 may read a computer program stored by the storage apparatus 22. For example, the arithmetic apparatus 21 may read a computer program stored in a computer-readable non-transitory recording medium, by using a non-illustrated recording medium reading apparatus. The arithmetic apparatus 21 may obtain (namely, download or read) a computer program from a non-illustrated apparatus disposed outside the parameter determination apparatus 2 through a non-illustrated communication apparatus. The arithmetic apparatus 21 executes the read computer program. As a result, a logical functional block for performing an operation that should be performed by the parameter determination apparatus 2 is implemented in the arithmetic apparatus 21. Namely, the arithmetic apparatus 21 is configured to serve as a controller for implementing the operation that should be performed by the parameter determination apparatus 2.

The storage apparatus 22 is configured to store desired data. For example, the storage apparatus 22 may temporarily store the computer program to be executed by the arithmetic apparatus 21. For example, the storage apparatus 22 may temporarily store the data that are temporarily used by the arithmetic apparatus 21 when the arithmetic apparatus 21 executes the computer program. For example, the storage apparatus 22 may store the data that are stored for a long term by the parameter determination apparatus 2. Note that the storage apparatus 22 may include at least one of a RAM, a ROM, a hard disk apparatus, a magneto-optical disk apparatus, an SSD, and a disk array apparatus. Namely, the storage apparatus 22 may include a non-transitory recording medium.

The input apparatus 23 is an apparatus that is configured to receive an input of an information from an outside of the parameter determination apparatus 2 to the parameter determination apparatus 2.

The output apparatus 24 is an apparatus that is configured to output an information to the outside of the parameter determination apparatus 2. For example, the output apparatus 24 may be a display apparatus that is configured to display the information related to the parameter determination apparatus 2.

<2-2> Functional Block in Arithmetic Apparatus 21

Figure 5:
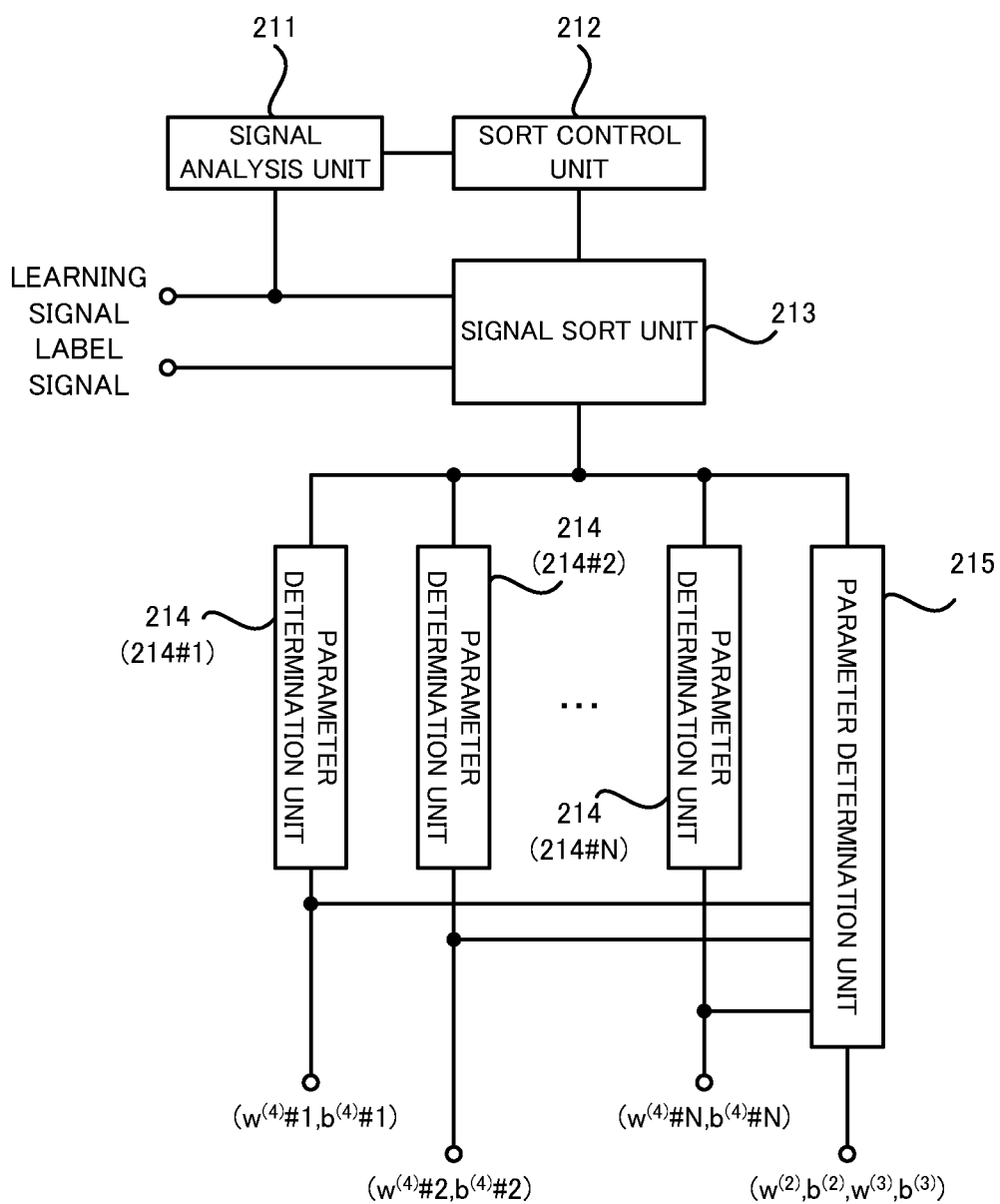
FIG. 5 is a block diagram that illustrates a functional block implemented in an arithmetic apparatus of the parameter determination apparatus in the present example embodiment.

Next, with reference to FIG. 5, the functional block that is implemented in the arithmetic apparatus 21 will be described. FIG. 5 is a block diagram that illustrates the functional block implemented in the arithmetic apparatus 21.

As illustrated in FIG. 5, the arithmetic apparatus 21 includes, as the logical functional blocks for determining the parameters of the Neural Network 112, a signal analysis unit 211 that is one specific example of "a classification unit", a sort control unit 212, a signal sort unit 213, a plurality of parameter determination units 214 each of which is one specific example of "a third generation unit", and a parameter determination unit 215 that is one specific example of "a second generation unit". The number of the parameter determination unit 214 is equal to the number of the types of the signal pattern that is usable as the input signal x. As described above, the N number of types of signal patterns are usable as the input signal x, the N number of parameter determination units 214 (specifically, the parameter determination unit 214 #1 to the parameter determination unit 214 #N) are implemented in the arithmetic apparatus 21 in the present example embodiment. Incidentally, when the plurality of parameter determination units 214 are regarded as one functional block, this functional block is one specific example of "a first generation unit".

Note that FIG. 5 merely conceptually (in other words, simply) illustrates the logical functional blocks for determining the parameters. Namely, the logical functional blocks illustrated in FIG. 5 is not necessarily implemented in the arithmetic apparatus 21 as they are, and a configuration of the logical functional block implemented in the arithmetic apparatus 21 is not limited to a configuration illustrated in FIG. 5, as long as the arithmetic apparatus 21 is configured to perform the operation that is performed by the logical functional blocks illustrated in FIG. 5.

The signal analysis unit 211 is configured to determine (in other words, calculate or classify) the signal pattern of a learning signal x by analyzing the learning signal that is used to determine the parameters. Namely, the signal analysis unit 141 is configured to determine, as the signal pattern of the learning signal, either one of the first type of signal pattern to the N-th type of signal pattern that are taken by the input signal x. In other words, the signal analysis unit 211 is configured to classify the signal pattern of the learning signal into the N number of types of signal patterns that are taken by the input signal x. A determined result of the signal pattern of the learning signal by the signal analysis unit 211 is outputted to the sort control unit 212. Note that a method of determining the signal pattern of the learning signal by the signal analysis unit 211 may be same as a method of determining the signal pattern of the input signal x by the above described signal analysis unit 141.

The learning signal is inputted into the parameter determination apparatus with a corresponding label signal. Furthermore, a plurality of learning signals are inputted into the parameter determination apparatus 2. Namely, a learning data set including a plurality of unit data each of which includes the learning signal and the label signal corresponding to the learning signal. Thus, the signal analysis unit 211 determines the signal pattern of each of the plurality of learning signals. Note that signal that are sequential on a time-series basis may be uses as the plurality of learning signals. In this case, each of a plurality of signal components obtained by dividing the signal that is sequential on a time-series basis may be regarded to correspond to one learning signal.

Each of the learning signal and the label signal may be a signal based on at least one of the input signal x, the distortion compensation signal y and the transmission signal z, for example. Each of the learning signal and the label signal may be a signal that is generated by using at least one of the input signal x, the distortion compensation signal y and the transmission signal z, for example. A method of generating the learning signal and the label signal may be selected based on an algorithm for the distortion compensation in the distortion compensation apparatus 11. For example, when an indirect learning method is used as the algorithm, a signal corresponding to the transmission signal z may be used as the learning data and a signal corresponding to the distortion compensation signal y or the input signal x may be used as the label signal. Namely, the distortion compensation signal y that should be outputted from the distortion compensation apparatus 11 or the input signal x that should be inputted to the distortion compensation apparatus 11 when a certain learning signal is outputted from the power amplifier 12 as the transmission signal z may be used as the label signal. Alternatively, for example, when a direct learning method is used as the algorithm, a signal corresponding to the input signal x may be used as the learning data and a signal corresponding to the distortion compensation signal y may be used as the label signal. Namely, the distortion compensation signal y that should be outputted from the distortion compensation apparatus 11 (namely, the distortion compensation signal y that is obtained by performing an ILC (Iterative Learning Control)) when a certain learning signal is inputted to the distortion compensation apparatus 11 may be used as the label signal.

The sort control unit 212 is configured to output, based on the signal pattern of the learning signal determined by the signal analysis unit 211, each learning signal into one parameter determination unit 214 of the N number of parameter determination units 214 that corresponds to the signal pattern of each learning signal. For example, the sort control unit 212 may (1) output the learning signal having the first type of signal pattern into the parameter determination unit 214 #1, (2) output the learning signal having the second type of signal pattern into the parameter determination unit 214 #2, . . . , and (N) output the learning signal having the N-th type of signal pattern into the parameter determination unit 214 #N.

The sort control unit 212 is further configured to output the label signal corresponding to each learning signal into one parameter determination unit 214 of the N number of parameter determination units 214 that corresponds to the signal pattern of each learning signal. For example, the sort control unit 212 may (1) output the label signal corresponding to the learning signal having the first type of signal pattern into the parameter determination unit 214 #1, (2) output the label signal corresponding to the learning signal having the second type of signal pattern into the parameter determination unit 214 #2, . . . , and (N) output the label signal corresponding to the learning signal having the N-th type of signal pattern into the parameter determination unit 214 #N.

The sort control unit 212 is further configured to output the learning signal having the first type of signal pattern to the learning signal having the N-th type of signal pattern into the parameter determination unit 215. Furthermore, the sort control unit 212 is configured to output the label signal corresponding to the learning signal having the first type of signal pattern to the label signal corresponding to the learning signal having the N-th type of signal pattern into the parameter determination unit 215. However, the parameter determination unit 215 may obtain the learning signals and the label signals from the parameter determination units 214 #1 to 214 #N. For example, the parameter determination unit 215 may (1) obtain the learning signal having the first type of signal pattern and the label signal corresponding to this learning signal from the parameter determination unit 214 #1, (2) obtain the learning signal having the second type of signal pattern and the label signal corresponding to this learning signal from the parameter determination unit 214 #2, . . . , and (N) obtain the learning signal having the N-th type of signal pattern and the label signal corresponding to this learning signal from the parameter determination unit 214 #N.

The sort control unit 212 may output the learning signals and the label signals into at least one of the parameter determination units 214 #1 to 214 #N and the parameter determination unit 215 by controlling the signal sort unit 213. Note that the signal sort unit 213 may be a functional block including a switch, as with the above described switch output unit 143. Thus, a detailed description of the signal sort unit 213 is omitted.

The parameter determination unit 214 #p (note that p is a variable number (an index) representing an integer that is equal to or larger than 1 and that is equal to or smaller than N) is configured to determine (in other words, learn) the parameters for the output layer 112O based on the learning signal having the p-th type of signal pattern and the label signal corresponding to this learning signal. The parameters for the output layer 112O determined by the parameter determination unit 214 #p are used as the parameters that should be applied to the output layer 112O when the distortion compensation processing is performed on the input signal x having the p-th type of signal pattern. Thus, the parameters for the output layer 112O determined by the parameter determination unit 214 #p are outputted from the parameter determination apparatus 2 to the signal transmission apparatus 1 and stored as the parameter set 131 #p in the storage apparatus 13.

The parameter determination unit 215 is configured to determine (in other words, learn) the parameters for the first hidden layer $112M^{(2)}$ and the second hidden layer $112M^{(3)}$ by using the learning signal having the first type of signal pattern to the learning signal having the N-th type of signal pattern (furthermore, the label signal corresponding to the learning signal having the first type of signal pattern to the label signal corresponding to the learning signal having the N-th type of signal pattern). Namely, the parameter determination unit 215 is configured to determine the parameters for other layer (in this case, the hidden layers 112M) of the Neural Network 112 other than the input layer 112I and the output layer 112O. The parameters for the output layer 112O determined by the parameter determination unit 214 #p are used as the parameters that should be applied to the output layer 112O when the distortion compensation processing is performed on the input signal x having the p-th type of signal pattern. Thus, the parameters for first hidden layer $112M^{(2)}$ and the second hidden layer $112M^{(3)}$ determined by the parameter determination unit 215 are outputted from the parameter determination apparatus 2 to the signal transmission apparatus 1 and applied to the first hidden layer $112M^{(2)}$ and the second hidden layer $112M^{(3)}$.

<2-3> Flow of Operation for Determining Parameters

Figure 6:
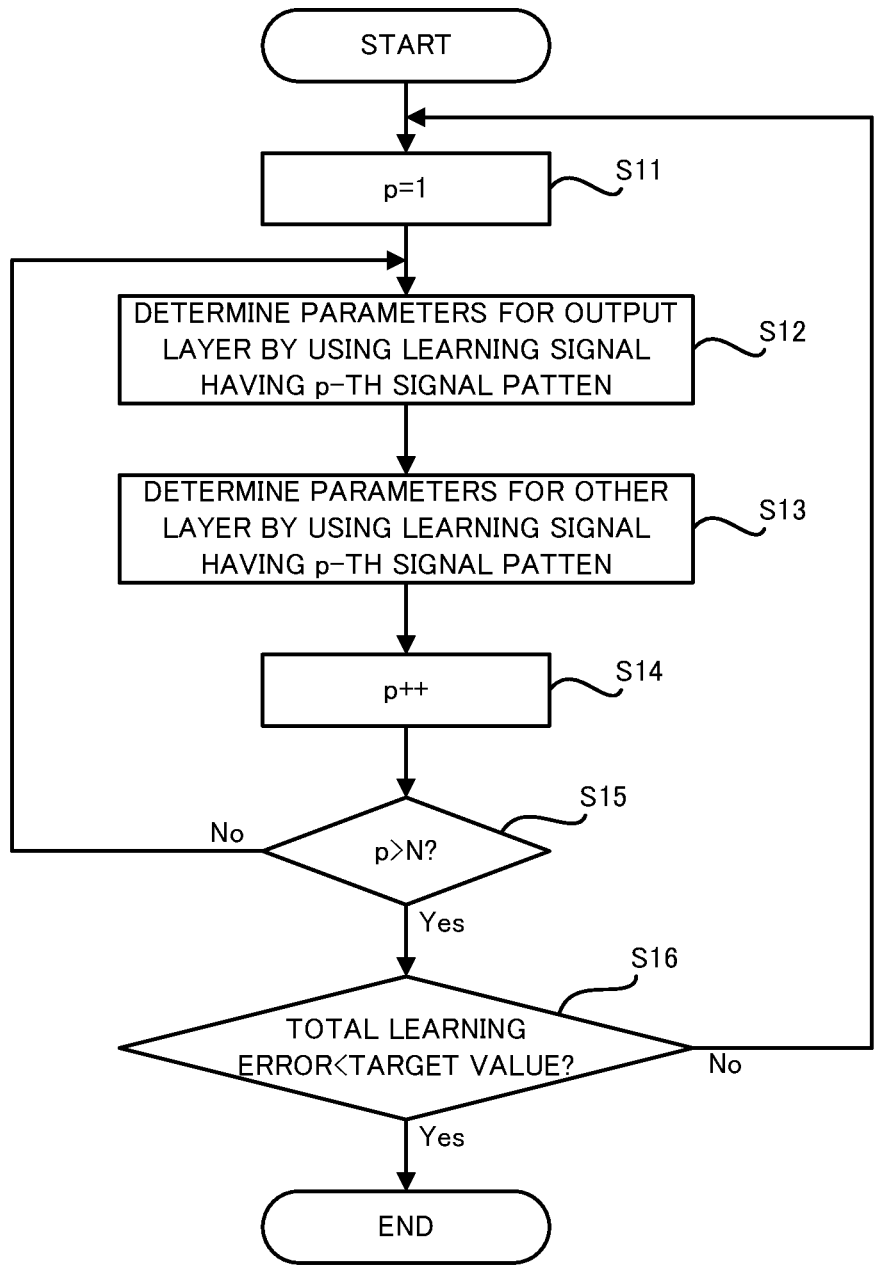
FIG. 6 is a flow chart that illustrates a flow of an operation for determining a parameter.

Next, with reference to FIG. 6, a flow of an operation for determining the parameters by the parameter determination units 214 and 215 will be described. FIG. 6 is a flowchart that illustrates the flow of the operation for determining the parameters by the parameter determination units 214 and 215.

As illustrated in FIG. 6, firstly, the arithmetic apparatus 21 set the variable number p to be 1 (step S11).

Then, the parameter determination unit 214 #p performs a learning operation for determining the parameters for the output layer 112O based on the learning signal having the p-th type of signal pattern and the label signal corresponding to this learning signal (a step S12). Specifically, the parameter determination unit 214 #p inputs the learning signal having the p-th type of signal pattern into a Neural Network 112' for learning (not illustrated) that has same configuration as the Neural Network 112. Then, the parameter determination unit 214 #p changes the parameters of an output layer 112O' (not illustrated) of the Neural Network 112' for learning so that a difference (namely, a learning error) between the label signal and a signal outputted from the Neural Network 112' for learning decreases (preferably, is minimized). As a result, the parameter determination unit 214 #p determines the parameters of the output layer 1120O' as the parameters for the output layer 112O (namely, the parameter set 131 #p). In this manner, the parameter determination unit 214 #p is capable of generating the parameter set 131 #p.

The parameter determination unit 214 #p may perform the learning operation illustrated in step S12 after an amount of the learning signal having the p-th type of signal pattern that has been inputted from the signal sort unit 213 to the parameter determination unit 214 #p is equal to or larger than a predetermined amount. Namely, the parameter determination unit 214 #p may perform the learning operation illustrated in step S12 after the sampled number of the learning signal having the p-th type of signal pattern that has been inputted from the signal sort unit 213 to the parameter determination unit 214 #p is equal to or larger than a predetermined number. However, the parameter determination unit 214 #p may perform the learning operation illustrated in step S12 every time the learning signal having the p-th type of signal pattern is inputted from the signal sort unit 213 to the parameter determination unit 214 #p.

Then, the parameter determination unit 215 performs a learning operation for determining the parameters for the first hidden layer 112M$^{(2)}$ and the second hidden layer 112M$^{(3)}$ based on the learning signal having the p-th type of signal pattern and the label signal corresponding to this learning signal (a step S13). Specifically, the parameter determination unit 215 inputs the learning signal having the p-th type of signal pattern into the Neural Network 112' for learning in which the parameters determined by the parameter determination unit 214 #p at the step S12 have been applied to the output layer 112O'. Then, the parameter determination unit 215 changes the parameters of a first hidden layer 112M'$^{(2)}$ and a second hidden layer 112M'$^{(3)}$ of the Neural Network for learning so that a difference (namely, a learning error) between the label signal and a signal outputted from the Neural Network 112' for learning decreases (preferably, is minimized). As a result, the parameter determination unit 215 determines the parameters of the first hidden layer 112M'$^{(2)}$ and the second hidden layer 112M'$^{(3)}$ as the parameter set including the parameters for the first hidden layer 112M$^{(2)}$ and the second hidden layer 112M$^{(3)}$. In this manner, the parameter determination unit 215 is capable of generating the parameter set including the parameters for the first hidden layer 112M$^{(2)}$ and the second hidden layer 112M$^{(3)}$.

The parameter determination units 214 #p and 215 may determine the parameters by using a Backpropagation. In this case, the parameter determination units 214 #p and 215 may determine the parameters by using an optimization algorithm that is usually used in a learning of the Neural Network. At least one of a SGD (Stochastic Gradient Descent) and ADAM (Adaptive Moment Estimation) is one example of the optimization algorithm.

Then, the arithmetic apparatus 21 increments the variable number p by 1 (a step S14). Then, the arithmetic apparatus 21 determines whether or not the variable number p is larger than the variable number N (namely, the number of the type of the signal pattern) (a step S15).

As a result of the determination at the step S15, when it is determined that the variable number p is not larger than the variable number N (the step S15: No), it is estimated that a part of the N number of parameter determination units 214 #1 to 214 #N has not yet complete learning operation for determining the parameters for the output layer 112O. Namely, it is estimated that a part of the N number of parameter sets 131 #1 to 131 #N has not yet been generated. Thus, in this case, the operation from the step S12 to the step S14 is performed again.

As a result, the parameter determination apparatus 2 repeats the operation from the step S12 to the step S14 N number of times. Namely, the parameter determination apparatus 2 (especially, the N number of parameter determination units 214 #1 to 214 #N) repeats the learning operation for determining the parameters for the output layer 112O based on the learning signal having the p-th type of signal pattern N number of times while changing the variable number p. As a result, the N number of parameter sets 131 #1 to 131 #N are generated. Namely, the N number of parameter determination units 214 #1 to 214 #N generate the parameter sets 131 #1 including the parameters for the output layer 112O learned based on the learning signal having the first type of signal pattern to the parameter sets 131 #N including the parameters for the output layer 112O learned based on the learning signal having the N-th type of signal pattern, respectively. Moreover, the parameter determination apparatus 2 (especially, the parameter determination unit 215) repeats the learning operation for determining the parameters for first hidden layer 112M$^{(2)}$ and the second hidden layer 112M$^{(3)}$ based on the learning signal having the p-th type of signal pattern N number of times while changing the variable number p. In this case, the parameter determination unit 215 may generate only one parameter set including the parameters for first hidden layer 112M$^{(2)}$ and the second hidden layer 112M$^{(3)}$. Thus, the parameter determination unit 215 generates one parameter set including the parameters for first hidden layer 112M$^{(2)}$ and the second hidden layer 112M$^{(3)}$ learned based on the learning signal having the first type of signal pattern to the learning signal having the N-th type of signal pattern.

On the other hand, as a result of the determination at the step S15, when it is determined that the variable number p is larger than the variable number N (the step S15: Yes), it is estimated that all of the N number of parameter determination units 214 #1 to 214 #N have complete learning operation for determining the parameters for the output layer 112O. Namely, it is estimated that all of the N number of parameter sets 131 #1 to 131 #N have been generated. In this case, the arithmetic apparatus 21 determines whether or not a total learning error is smaller than a target value (a step S16). Note that "the total learning error" means a learning error determined based on the N number of learning errors that are respectively used in the operations from the step S12 to the step S14 that is repeated N number of times. Namely, "the total learning error" means a learning error determined based on the learning error that is used when the operation from the step S12 to the step S14 is performed by using the learning signal having the first type of signal pattern to the learning error that is used when the operation from the step S12 to the step S14 is performed by using the learning signal having the N-th type of signal pattern. As one example, the total learning error may be a total sum or an average of the N number of learning errors.

As a result of the determination at the step S16, when it is determined that the total learning error is not smaller than the target value (the step S16: No), it is estimated that the learning of the parameters is not sufficiently performed. Thus, in this case, the operation from the step S11 to the step S15 is performed again. On the other hand, as a result of the determination at the step S16, when it is determined that the total learning error is smaller than the target value (the step S16: Yes), it is estimated that the learning of the parameters is sufficiently performed. Thus, in this case, the parameter determination apparatus 2 ends the operation illustrated in FIG. 2.

The parameter determination apparatus 2 may determine the parameters for the Neural Network 112 before the signal transmission apparatus 1 is shipped. As a result, the signal transmission apparatus 1 in which the Neural Network 112 based on the parameters determined by the parameter determination apparatus 2 is implemented in a manufacturing factory, for example, is shipped. In this case, the parameter determination apparatus 2 may be typically implemented by using a relatively fast arithmetic apparatus such as an apparatus outside the signal transmission apparatus 1 (typically, a GPU (Graphical Processing Unit)). However, as described later, at least a part of the parameter determination apparatus 2 may be implemented in the signal transmission apparatus 1. The parameter determination apparatus 2 may determine the parameters for the Neural Network 112 after the signal transmission apparatus 1 is shipped (for example, during an operation of the signal transmission apparatus 1).

Incidentally, the variable number p is incremented by one from an initial value 1 in an example illustrated in FIG. 6. However, the arithmetic apparatus 21 may randomly select the variable number from integer that is between 1 to N inclusive.

<2-4> Technical Effect of Parameter Determination Apparatus 2

As described above, the parameter determination apparatus 2 in the present embodiment is capable of generating the N number of parameter sets 131 #1 to 131 #N by using the learning signal having the first type of signal pattern to the learning signal having the N-th type of signal pattern. Thus, the signal transmission apparatus 1 is capable of properly performing the distortion compensation processing by using the parameters included in one parameter set 131 that is selected, based on the signal pattern of the input signal x, from the N number of parameter sets 131 #1 to 131 #N generated by the parameter determination apparatus 2.

Moreover, the parameter determination apparatus 2 is capable of generating one parameter set including the parameters for the first hidden layer 112M$^{(2)}$ and the second hidden layer 112M$^{(3)}$ by using the learning signal having the first type of signal pattern to the learning signal having the N-th type of signal pattern. Here, in order to determine the parameters for the first hidden layer 112M$^{(2)}$ and the second hidden layer 112M$^{(3)}$ by using the learning signal having the p-th type of signal pattern, the parameter determination apparatus 2 uses the Neural Network 112' for learning to which the parameters for the output layer 112O determined by using the learning signal having the p-th type of signal pattern have been applied. Thus, when the signal pattern of the leaning signal that is used to determine the parameters for the first hidden layer 112M$^{(2)}$ and the second hidden layer 112M$^{(3)}$ is changed, the parameters of the output layer 112O' of the Neural Network 112' for learning are also switched. Thus, the parameter determination apparatus 2 is capable of determining the parameters for the first hidden layer 112M$^{(2)}$ and the second hidden layer 112M$^{(3)}$ based on an assumption that the parameters of the output layer 112O of the Neural Network 112 are switched based on the signal pattern of the input signal x. As a result, the Neural Network 112 to which the parameters for the first hidden layer 112M$^{(2)}$ and the second hidden layer 112M$^{(3)}$ determined in this manner have been applied is capable of properly performing the distortion compensation processing on the input signal x the signal pattern of which may be changed, even when the parameters for the first hidden layer 112M$^{(2)}$ and the second hidden layer 112M$^{(3)}$ are fixed. Namely, a degree of an deterioration of an accuracy of the distortion compensation processing due to the fixed parameters of the first hidden layer 112M$^{(2)}$ and the second hidden layer 112M$^{(3)}$ is so small that it can be ignored, compared to a case where the parameters of the first hidden layer 112M$^{(2)}$ and the second hidden layer 112M$^{(3)}$ are switched based on the signal pattern of the input signal x.

<3> Modified Example of Signal Transmission Apparatus 1

Next, a modified example of the signal transmission apparatus 1 will be described.

<3-1> Signal Transmission Apparatus 1ain First Modified Example

Figure 7:
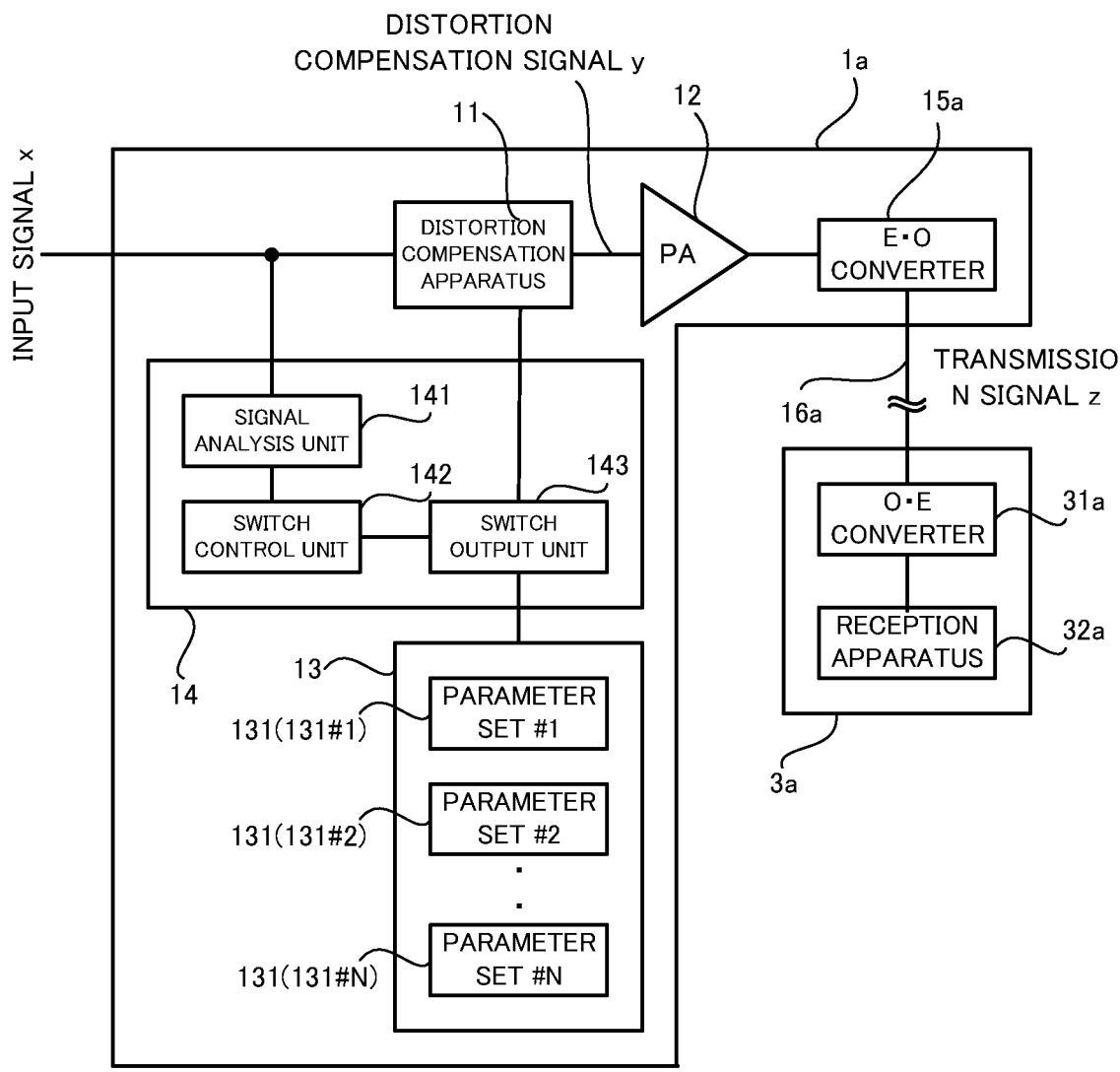
FIG. 7 a block diagram that illustrates a configuration of a signal transmission apparatus in a first modified example.

Firstly, with reference to FIG. 7, a signal transmission apparatus 1a in a first modified example will be described. FIG. 7 is a block diagram that illustrates a configuration of the signal transmission apparatus 1a in the first modified example.

As illustrated in FIG. 7, the signal transmission apparatus 1a is different from the signal transmission apparatus 1 in that it may be an apparatus that is configured to transmit the transmission signal z through an optical communication network (for example, an optical communication line). In this case, the signal transmission apparatus 1a is different from the signal transmission apparatus 1 in that it further includes an E·O (Electrical Signal to Optical Signal) converter 15a that is configured to convert the transmission signal z, which is outputted from the power amplifier 12, to an optical signal. As a result, the transmission signal z that has been converted to the optical signal is transmitted through a signal propagation path 16a (namely, a signal propagation path included in at least a part of the optical communication network) such as an optical fiber. A part of or whole of the signal propagation path 16a may be a component included in the signal transmission apparatus 1a. Alternatively, the signal propagation path 16a may be a component that is different from the signal transmission apparatus 1a.

A signal reception apparatus 3a that is configured to receive the transmission signal z converts the transmission signal z that is the optical signal to an electrical signal by using an O·E (Optical Signal to Electrical Signal) converter 31a, and then receive the transmission signal z that has been converted to the electric signal by using a reception apparatus 32a.

The distortion compensation apparatus 11 may perform, on the input signal x, a distortion compensation for compensating a distortion that is generated due to the transmission of the transmission signal z on the signal propagation path 16a (namely, a distortion that is generated in the transmission signal z on the signal propagation path 16a), in addition to or instead of the distortion that is generated in the transmission signal z due to the operation of the power amplifier 12. As a result, even when the transmission signal z is transmitted through the optical communication network (for example, the optical communication line), the distortion of the transmission signal z is properly compensated. In this case, considering that the distortion is generated in the transmission signal z on the signal propagation path 16a, each of the learning signal and the label signal described above may be a signal based on a reception signal that has been received by the signal reception apparatus 3a (namely, a signal that includes the distortion that has been generated in the transmission signal z on the signal propagation path 16a), in addition to or instead of at least one of the input signal x, the distortion compensation signal y and the transmission signal z, for example.

Incidentally, when the transmission signal z that has been converted to the optical signal is transmitted, the signal generating unit 111 may input, to the Neural Network 112, a X polarized wave component and a Y polarized wave component of the input signal $x_t$, instead of the above described various signals.

<3-2> Signal Transmission Apparatus 1b in Second Modified Example

Figure 8:
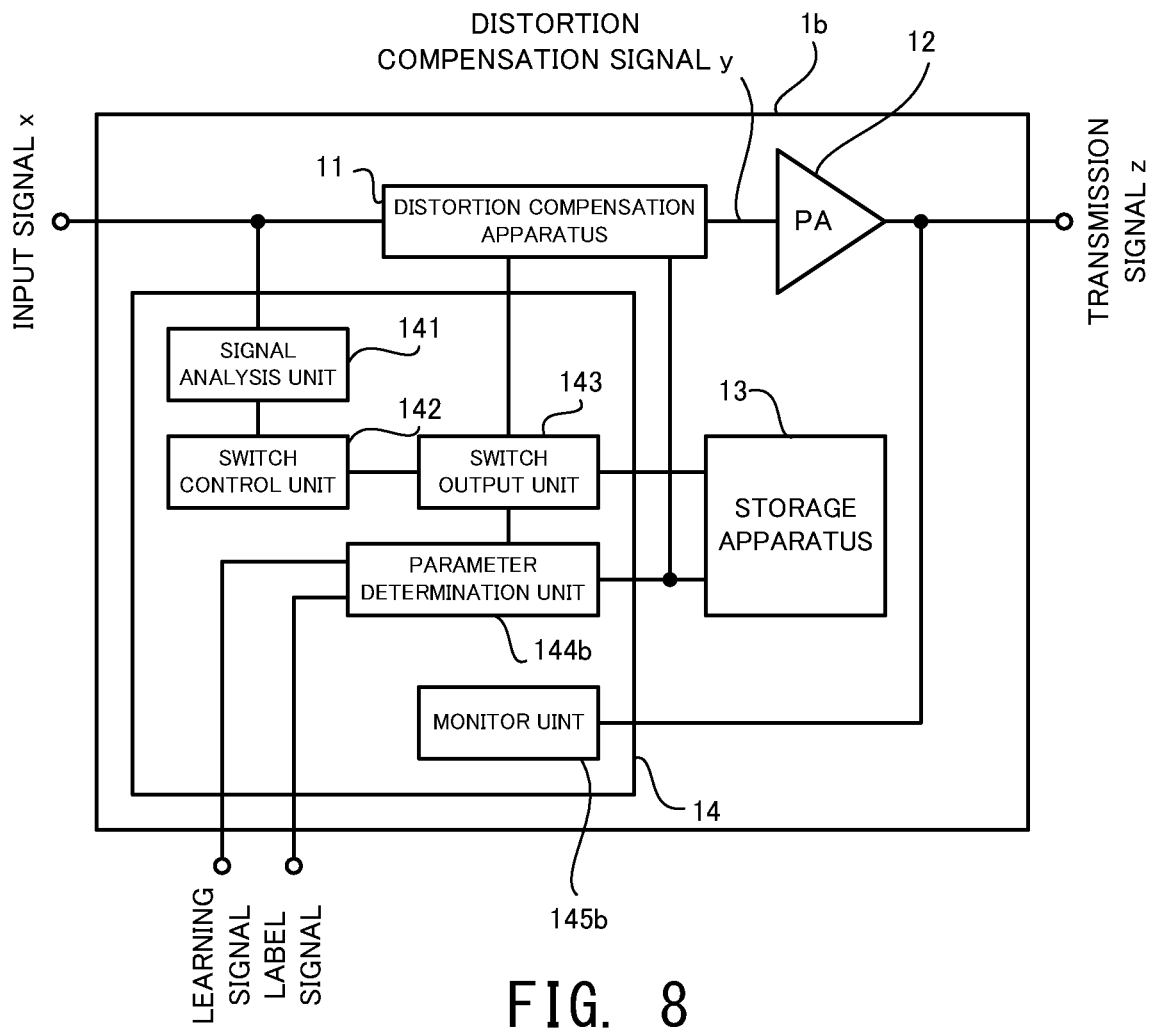
FIG. 8 a block diagram that illustrates a configuration of a signal transmission apparatus in a second modified example.

Next, with reference to FIG. 8, a signal transmission apparatus 1b in a second modified example will be described. FIG. 8 is a block diagram that illustrates a configuration of the signal transmission apparatus 1b in the second modified example.

As illustrated in FIG. 8, the signal transmission apparatus 1b is different from the signal transmission apparatus 1 in that a parameter determination unit 144b that is the functional block for determining the parameter(s) of the Neural Network 112 is implemented in the signal transmission apparatus 1b (specifically, in the arithmetic apparatus 14). The parameter determination unit 144b may include the functional block that is implemented in the arithmetic apparatus 21 of the above described parameter determination apparatus 2. Namely, the parameter determination unit 144b may include the signal analysis unit 211, the sort control unit 212, the signal sort unit 213, the plurality of parameter determination units 214 and the parameter determination unit 215. In this case, it can be said that the parameter determination apparatus 2 is implemented in the signal transmission apparatus 1b.

In this case, the signal transmission apparatus 1b itself is capable of updating the parameter(s) of the Neural Network 112. Thus, the parameter(s) of the Neural Network 112 can be updated after the signal transmission apparatus 1b is shipped. For example, the parameter(s) of the Neural Network 112 may be updated (in other words, adjusted) based on an actual usage condition of the signal transmission apparatus 1b when the signal transmission apparatus 1b is installed at an installation site. For example, the parameter(s) of the Neural Network 112 may be updated based on a characteristic of the transmission signal z that is actually transmitted by the signal transmission apparatus 1b after the signal transmission apparatus 1b starts to operate. For example, the parameter(s) of the Neural Network 112 may be updated based on a time degradation (namely, a drift) of the signal transmission apparatus 1b after the signal transmission apparatus 1b starts to operate. As a result, even after the signal transmission apparatus 1b is shipped, it is possible to keep a distortion compensation performance of the distortion compensation apparatus 11 in a relatively high condition.

Furthermore, the signal transmission apparatus 1b is capable of updating the parameter(s) of the Neural Network 112 by using the learning signal and the label signal that are based on at least one of the input signal x that is actually inputted to the signal transmission apparatus 1b, the distortion compensation signal y that is actually generated by the signal transmission apparatus 1b and the output signal z that is actually transmitted by the signal transmission apparatus 1b. Thus, the signal transmission apparatus 1b is capable of updating the parameter(s) of the Neural Network 112 depending on the actual usage condition of the signal transmission apparatus 1b.

Figure 9:
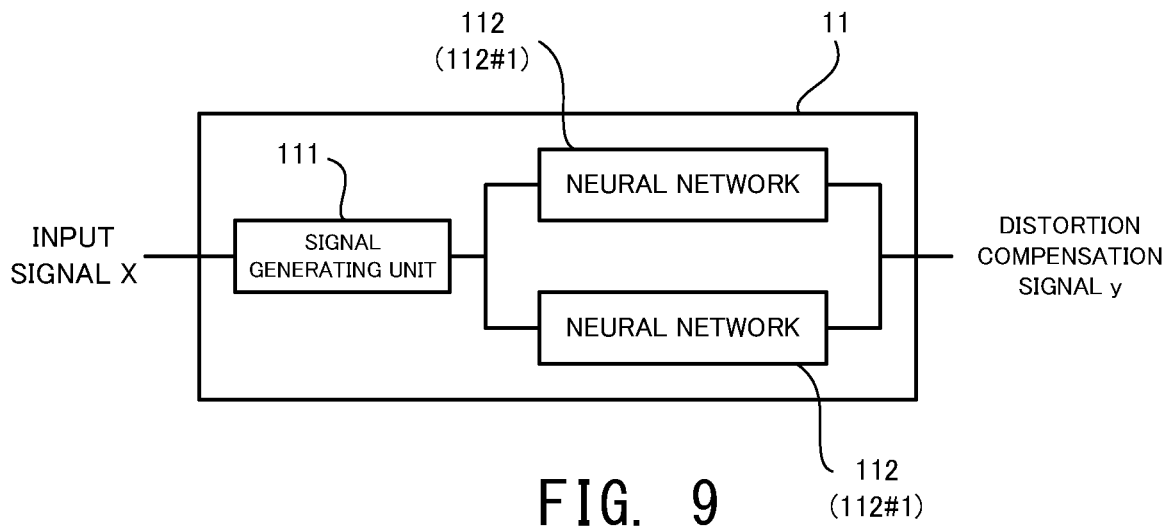
FIG. 9 a block diagram that illustrates another example of a configuration of a signal distortion apparatus in the second modified example.

The parameter(s) determined by the signal transmission apparatus 1b itself may be reflected in the Neural Network 112 at a desired timing. However, a period during which the signal transmission apparatus 1b cannot transmit the transmission signal z may possibly occur until the reflection of new parameter(s) in the Neural Network 112 is completed. Thus, as illustrated in FIG. 9, the distortion compensation apparatus 11 may adopt a redundant configuration in which it includes a plurality of Neural Network 112. FIG. 9 illustrates an example in which the distortion compensation apparatus 11 includes two Neural Network 112 #1 and 112 #2. In this case, the parameter(s) determined by the signal transmission apparatus 1b itself may be reflected in another Neural Network 112 (for example, the Neural Network 112 #2) in a period during which one Neural Network 112 (for example, the Neural Network 112 #1) performs the distortion compensation. Namely, the parameter(s) of another Neural Network 112 (for example, the Neural Network 112 #2) may be updated by the parameter(s) determined by the signal transmission apparatus 1b itself in the period during which one Neural Network 112 (for example, the Neural Network 112 #1) performs the distortion compensation. Then, a state of the distortion compensation apparatus 11 may be switched from a state in which one Neural Network 112 performs the distortion compensation to a state in which another Neural Network 112 in which new parameters has been reflected performs the distortion compensation. As a result, it is possible to reduce or eliminate the period during which the signal transmission apparatus 1b cannot transmit the transmission signal z.

A monitor unit 145b for monitoring the transmission signal z that is actually transmitted by the signal transmission apparatus 1b may be implemented in the arithmetic apparatus 14. In this case, the signal transmission apparatus 1b may determine based on a monitored result by the monitor unit 145b whether or not to update the parameter(s) of the Neural Network 112. For example, when a predetermined update start condition related to a characteristic of the transmission signal z monitored by the monitor unit 145b is satisfied, the signal transmission apparatus 1b may determine to update the parameter(s) of the Neural Network 112. On the other hand, when the predetermined update start condition related to the characteristic of the transmission signal z monitored by the monitor unit 145b is not satisfied, the signal transmission apparatus 1b may determine not to update the parameter(s) of the Neural Network 112. A condition that the distortion of the transmission signal z is equal to or larger than an allowable value is one example of the update start condition.

<3-3> Other Modified Example

In the above described description, the signal transmission apparatus 1 switches the parameter of the output layer 112O and does not switch the parameter of other layer (the hidden layer 112M in this case) of the Neural Network 112 other than the input layer 112I and the output layer 112O. However, the signal transmission apparatus 1 may switch the parameter of Q (note that Q is a variable number representing an integer that is equal to or larger than 1 and that is equal to or smaller than L) number of layer among the L+1 number of layers, which include the L number of hidden layer 112M and the output layer 112O, included in the Neural Network 112 and may not switch the parameter of other layer (namely, L+1-Q number of other layer) other than the Q number of layer among the L+1 number of layer. For example, the signal transmission apparatus 1 may switch the parameters of the output layer 112O and the second hidden layer $112M^{(3)}$ and may not switch the parameter of the first hidden layer $112M^{(2)}$. For example, the signal transmission apparatus 1 may switch the parameters of the first hidden layer $112M^{(2)}$ and the second hidden layer $112M^{(3)}$ and may not switch the parameter of the output layer 112O. For example, the signal transmission apparatus 1 may switch the parameter of the second hidden layer $112M^{(3)}$ and may switch the parameters of the output layer 112O and the first hidden layer $112M^{(2)}$. For example, the signal transmission apparatus 1 may switch the parameter of the first hidden layer $112M^{(2)}$ and may switch the parameters of the output layer 112O and the second hidden layer $112M^{(3)}$. Even in any cases, the fact remains that the increase of the size of the circuit of the storage apparatus 13 is reduced compared to the case where the parameters of all of the first hidden layer $112M^{(2)}$, the second hidden layer $112M^{(3)}$ and the output layer 112O are switched.

Moreover, when the signal transmission apparatus 1 switches the parameter of Q number of layer and does not switch the parameter of other layer other than the Q number of layer, the parameter determination units 214 #1 to 214 #N may generate the N number of parameter sets 131 #1 to 131 #N each of which includes the parameter for the Q number of layer by using the learning signal having the first type of signal pattern to the learning signal having the N-th type of signal pattern, respectively. Moreover, the parameter determination unit 215 may generate one parameter set including the parameter for L+1-Q number of layer by using the learning signal having the first type of signal pattern to the learning signal having the N-th type of signal pattern.

<5> Supplementary Note

With respect to the example embodiments described above, the following Supplementary Notes will be further disclosed.

[Supplementary Note 1]

A signal transmission apparatus including:
- a distortion compensation unit that is configured to perform a distortion compensation processing on an input signal by using a Neural Network including arithmetic layers the number of which is L+1, wherein the arithmetic layers include a hidden layer the number of which is L (note that L is a variable number representing an integer that is equal to or larger than 1) and an output layer;
- a storage unit that is configured to store a plurality of parameter sets each of which includes a parameter for a Q (note that Q is a variable number representing an integer that is equal to or smaller than L) number of arithmetic layer of the L+1 number of arithmetic layers; and
- an application unit that is configured to select one parameter set from the plurality of parameter sets based on a signal pattern of the input signal and apply the parameter included in the selected one parameter set to the M number of arithmetic layer,
- a parameter of another arithmetic layer of the L+1 number of arithmetic layers, which is other than the Q number of arithmetic layer, being fixed.

[Supplementary Note 2]

The signal transmission apparatus according to the Supplementary Note 1, wherein
the Q number of arithmetic layer includes the output layer.

[Supplementary Note 3]

The signal transmission apparatus according to the Supplementary Note 2, wherein
the variable number Q is 1,
the parameter of the L number of hidden layer is fixed.

[Supplementary Note 4]

The signal transmission apparatus according to any one of the Supplementary Notes 1 to 3, wherein
each of the plurality of parameter sets includes the parameter that should be applied to the M number of arithmetic layer when the distortion compensation processing is performed on the input signal having one signal pattern corresponding to each parameter set.

[Supplementary Note 5]

The signal transmission apparatus according to any one of the Supplementary Notes 1 to 4, wherein
the signal transmission apparatus further includes a determination unit that is configured to determine the signal pattern of the input signal,
the application unit is configured to select the one parameter set based on a determined result by the determination unit.

[Supplementary Note 6]

The signal transmission apparatus according to the Supplementary Note 5, wherein
the determination unit is configured to determine the signal pattern of the input signal based on an electric power characteristic of the input signal.

[Supplementary Note 7]

The signal transmission apparatus according to the Supplementary Note 6, wherein
the electric power characteristic includes at least one of an average electric power and an electric power distribution of the input signal.

[Supplementary Note 8]

A parameter determination apparatus that is configured to determine, by using a plurality of learning signals, a parameter of a Neural Network including arithmetic layers the number of which is L+1, wherein the arithmetic layers include a hidden layer the number of which is L (note that L is a variable number representing an integer that is equal to or larger than 1) and an output layer, wherein
the parameter determination apparatus includes:
- a classification unit that is configured to classify a signal pattern of each of the plurality of learning signals into N number of types of signal patterns;
- a first generation unit that is configured to generate N number of first parameter sets each of which includes a parameter for a Q (note that Q is a variable number representing an integer that is equal to or smaller than L) number of arithmetic layer of the L+1 number of arithmetic layers by respectively using the N number of types of learning signals that have been classified into the N number of types of signal patterns, respectively; and
- a second generation unit that is configured to generate one second parameter set including a parameter for another arithmetic layer of the L+1 number of arithmetic layers, which is other than the Q number of arithmetic layer, by using the N number of types of learning signals.

[Supplementary Note 9]

The parameter determination apparatus according to the Supplementary Note 8, wherein
the first generation unit is configured to generate the N number of first parameter sets by repeating a learning operation N number of times while changing the type of the signal pattern of the learning signal used for the learning operation, and
the learning operation is an operation for learning the parameter for the M number of arithmetic layer by using the learning signal that has been classified into one type of signal pattern.

[Supplementary Note 10]

The parameter determination apparatus according to the Supplementary Note 8 or 9, wherein
the first generation unit includes N number of parameter generation units each of which generates the first parameter set by using the learning signal that has been classified into corresponding one type of signal pattern.

[Supplementary Note 11]

The parameter determination apparatus according to any one of the Supplementary Notes 8 to 10, wherein
the second generation unit is configured to generate the second parameter set by repeating an operation for learning the parameter of the another arithmetic layer by sequentially using the N number of types of learning signals that have been classified into the N number of types of signal patterns, respectively.

[Supplementary Note 12]

The parameter determination apparatus according to any one of the Supplementary Notes 8 to 11, wherein
the Q number of arithmetic layer includes the output layer.

[Supplementary Note 13]

The parameter determination apparatus according to the Supplementary Note 12, wherein
the variable number Q is 1.

[Supplementary Note 14]

The parameter determination apparatus according to any one of the Supplementary Notes 8 to 13, wherein
the classification unit is configured to classify the signal pattern of the learning signal based on an electric power characteristic of the learning signal.

[Supplementary Note 15]

The parameter determination apparatus according to the Supplementary Note 14, wherein
the electric power characteristic includes at least one of an average electric power and an electric power distribution of the learning signal.

[Supplementary Note 16]

A signal transmission method including:
a distortion compensation step at which a distortion compensation processing is performed on an input signal by using a Neural Network including arithmetic layers the number of which is L+1, wherein the arithmetic layers include a hidden layer the number of which is L (note that L is a variable number representing an integer that is equal to or larger than 1) and an output layer; and
an application step at which one parameter set is selected based on a signal pattern of the input signal from a storage unit that is configured to store a plurality of parameter sets each of which includes a parameter for a Q (note that Q is a variable number representing an integer that is equal to or smaller than L) number of arithmetic layer of the L+1 number of arithmetic layers, and the parameter included in the selected one parameter set is applied to the M number of arithmetic layer,
a parameter of another arithmetic layer of the L+1 number of arithmetic layers, which is other than the Q number of arithmetic layer, being fixed.

[Supplementary Note 17]

A parameter determination method of determining, by using a plurality of learning signals, a parameter of a Neural Network including arithmetic layers the number of which is L+1, wherein the arithmetic layers include a hidden layer the number of which is L (note that L is a variable number representing an integer that is equal to or larger than 1) and an output layer, wherein
the parameter determination method includes:
a classification step at which a signal pattern of each of the plurality of learning signals is classified into N number of types of signal patterns;
a first generation step at which N number of first parameter sets each of which includes a parameter for a Q (note that Q is a variable number representing an integer that is equal to or smaller than L) number of arithmetic layer of the L+1 number of arithmetic layers are generated by respectively using the N number of types of learning signals that have been classified into the N number of types of signal patterns, respectively; and
a second generation step at which one second parameter set including a parameter for another arithmetic layer of the L+1 number of arithmetic layers, which is other than the Q number of arithmetic layer, is generated by using the N number of types of learning signals.

[Supplementary Note 18]

A recording medium on which a computer program allowing a computer to execute a signal transmission method is recorded, wherein
the signal transmission method includes:
a distortion compensation step at which a distortion compensation processing is performed on an input signal by using a Neural Network including arithmetic layers the number of which is L+1, wherein the arithmetic layers include a hidden layer the number of which is L (note that L is a variable number representing an integer that is equal to or larger than 1) and an output layer; and
an application step at which one parameter set is selected based on a signal pattern of the input signal from a storage unit that is configured to store a plurality of parameter sets each of which includes a parameter for a Q (note that Q is a variable number representing an integer that is equal to or smaller than L) number of arithmetic layer of the L+1 number of arithmetic layers, and the parameter included in the selected one parameter set is applied to the M number of arithmetic layer,
a parameter of another arithmetic layer of the L+1 number of arithmetic layers, which is other than the Q number of arithmetic layer, being fixed.

[Supplementary Note 19]

A recording medium on which a computer program allowing a computer to execute a parameter determination method is recorded, wherein
the parameter determination method is a parameter determination method of determining, by using a plurality of learning signals, a parameter of a Neural Network including arithmetic layers the number of which is L+1, wherein the arithmetic layers include a hidden layer the number of which is L (note that L is a variable number representing an integer that is equal to or larger than 1) and an output layer,
the parameter determination method includes:
a classification step at which a signal pattern of each of the plurality of learning signals is classified into N number of types of signal patterns;
a first generation step at which N number of first parameter sets each of which includes a parameter for a Q (note that Q is a variable number representing an integer that is equal to or smaller than L) number of arithmetic layer of the L+1 number of arithmetic layers are generated by respectively using the N number of types of learning signals that have been classified into the N number of types of signal patterns, respectively; and
a second generation step at which one second parameter set including a parameter for another arithmetic layer of the L+1 number of arithmetic layers, which is other than the Q number of arithmetic layer, is generated by using the N number of types of learning signals.

The present invention is allowed to be changed, if desired, without departing from the essence or spirit of the invention which can be read from the claims and the entire specification, and a signal transmission apparatus, a parameter determination apparatus, a signal transmission method, a parameter determination method and a recording medium, which involve such changes, are also intended to be within the technical scope of the present invention.

DESCRIPTION OF REFERENCE CODES 1 signal transmission apparatus
11 distortion compensation circuit
112 Neural Network
13 storage apparatus
131 parameter set
14 arithmetic apparatus
141 signal analysis unit
142 switch control unit
143 switch output unit
2 parameter determination apparatus
21 arithmetic apparatus
211 signal analysis unit
212 sort control unit
213 signal sort unit
214, 215 parameter determination unit

What is claimed is:

1. A signal transmission apparatus comprising:
at least one memory configured to store instructions; and
at least one processor configured to execute the instructions to:
perform a distortion compensation processing on an input signal by using a Neural Network including L+1 number of arithmetic layers, wherein the arithmetic layers include L hidden layers and an output layer, and wherein L is a variable number representing an integer that is equal to or larger than 1;
select, from a storage that is configured to store a plurality of parameter sets that each include a parameter for Q number of arithmetic layers of the L+1 number of arithmetic layers, one parameter set based on a signal pattern of the input signal, wherein Q is a variable number representing an integer that is equal to or smaller than L; and
apply the parameter included in the selected one parameter set to the Q number of arithmetic layers, wherein
a parameter of an arithmetic layer of the L+1 number of arithmetic layers, other than the Q number of arithmetic layers, is fixed.

2. The signal transmission apparatus according to claim 1, wherein
the Q number of arithmetic layers includes the output layer.

3. The signal transmission apparatus according to claim 2, wherein
the variable number Q is 1,
the parameter of the L number of hidden layers is fixed.

4. The signal transmission apparatus according to claim 1, wherein
each of the plurality of parameter sets includes the parameter that is to be applied to the Q number of arithmetic layers when the distortion compensation processing is performed on the input signal having one signal pattern corresponding to each parameter set.

5. The signal transmission apparatus according to claim 1, wherein
the at least one processor is configured to execute the instructions to:
determine the signal pattern of the input signal; and
select the one parameter set based on a determination result.

6. The signal transmission apparatus according to claim 5, wherein
the at least one processor is configured to execute the instructions to determine the signal pattern of the input signal based on an electric power characteristic of the input signal.

7. The signal transmission apparatus according to claim 6, wherein
the electric power characteristic includes at least one of an average electric power and an electric power distribution of the input signal.

8. A signal transmission method performed by a computer and comprising:
performing a distortion compensation processing on an input signal by using a Neural Network including L+1 number of arithmetic layers, wherein the arithmetic layers include L hidden layers and an output layer, and wherein L is a variable number representing an integer that is equal to or larger than 1;
selecting, from a storage that is configured to store a plurality of parameter sets that each include a parameter for Q number of arithmetic layers of the L+1 number of arithmetic layers, one parameter set based on a signal pattern of the input signal, wherein Q is a variable number representing an integer that is equal to or smaller than L; and
applying the parameter included in the selected one parameter set to the Q number of arithmetic layers, wherein
a parameter of an arithmetic layer of the L+1 number of arithmetic layers, other than the Q number of arithmetic layers, is fixed.

9. A non-transitory recording medium storing a computer program executable by a computer to execute perform a signal transmission method comprising:
performing a distortion compensation processing on an input signal by using a Neural Network including L+1 number of arithmetic layers, wherein the arithmetic layers include L hidden layers and an output layer, and wherein L is a variable number representing an integer that is equal to or larger than 1;
selecting, from a storage that is configured to store a plurality of parameter sets that each include a parameter for Q number of arithmetic layers of the L+1 number of arithmetic layers, one parameter set based on a signal pattern of the input signal, wherein Q is a variable number representing an integer that is equal to or smaller than L; and
applying the parameter included in the selected one parameter set to the Q number of arithmetic layers, wherein
a parameter of an arithmetic layer of the L+1 number of arithmetic layers, other than the Q number of arithmetic layers, is fixed.

* * * * *